United States Patent
Mabuchi et al.

(10) Patent No.: US 7,306,411 B2
(45) Date of Patent: Dec. 11, 2007

(54) DRILL WITH GROOVE WIDTH VARIATION ALONG THE DRILL AND DOUBLE MARGIN WITH A THINNING SECTION AT THE TIP

(75) Inventors: Masayuki Mabuchi, Ibi-gun (JP); Kazuya Yanagida, Ogaki (JP); Katsuyuki Suzuki, Ogaki (JP); Syoji Takiguchi, Ogaki (JP)

(73) Assignee: Mitsubishi Materials Corporation, Tokyo (JP)

( * ) Notice: Subject to any disclaimer, the term of this patent is extended or adjusted under 35 U.S.C. 154(b) by 276 days.

(21) Appl. No.: 10/650,683

(22) Filed: Aug. 29, 2003

(65) Prior Publication Data
US 2004/0101379 A1    May 27, 2004

(30) Foreign Application Priority Data

| Sep. 3, 2002 | (JP) | ............................. 2002-257597 |
| Sep. 3, 2002 | (JP) | ............................. 2002-257598 |
| Dec. 16, 2002 | (JP) | ............................. 2002-363602 |
| Dec. 16, 2002 | (JP) | ............................. 2002-363603 |

(51) Int. Cl.
*B23B 51/02* (2006.01)

(52) U.S. Cl. ........................ 408/230; 408/227; 408/144

(58) Field of Classification Search ................ 408/230, 408/227, 144; *B23B 51/02*
See application file for complete search history.

(56) References Cited

U.S. PATENT DOCUMENTS

| 390,672 | A | * | 10/1888 | Holmes | ........................ 408/230 |
| 472,541 | A | * | 4/1892 | Johnson | ........................ 408/230 |
| 542,223 | A | * | 7/1895 | Johnson | ........................ 408/230 |
| 750,537 | A | * | 1/1904 | Hanson | ........................ 408/230 |
| 2,897,695 | A | * | 8/1959 | Winslow | ..................... 408/224 |
| 3,977,807 | A | * | 8/1976 | Siddall | ........................ 408/223 |
| 4,080,093 | A | * | 3/1978 | Maier | .......................... 408/230 |
| 5,312,209 | A | * | 5/1994 | Lindblom | ................... 408/230 |

(Continued)

FOREIGN PATENT DOCUMENTS

DE    100 27 544    12/2001

(Continued)

*Primary Examiner*—Monica Carter
*Assistant Examiner*—Sara Addisu
(74) *Attorney, Agent, or Firm*—Oblon, Spivak, McClelland, Maier & Neustadt, P.C.

(57) ABSTRACT

In a drill in which a chip discharge groove twisted in the shape of a spiral relative to an axis is formed in the outer periphery of the tip section of a roughly cylindrical drill body that rotates around the axis, and a cutting edge is formed on the intersecting ridgeline between a wall surface facing in the direction of drill rotation of this chip discharge groove and a tip flank of the drill body, together with the section on the tip side of the chip discharge groove continuous with the cutting edge being a narrowed width section in which the helix angle relative to the axis and groove width are constant, a wide width section is formed in the chip discharge groove farther towards the rear end than this narrow width section, in which the helix angle is equal to the narrow width section and in which the groove width is widened relative to the narrow width section in the direction of drill rotation and towards the rear in the direction of drill rotation and has a constant width.

14 Claims, 20 Drawing Sheets

U.S. PATENT DOCUMENTS

| | | | |
|---|---|---|---|
| 5,486,075 A * | 1/1996 | Nakamura et al. | 408/230 |
| 5,599,144 A | 2/1997 | Bickham et al. | |
| 5,678,960 A | 10/1997 | Just et al. | |
| 5,800,101 A * | 9/1998 | Jindai et al. | 408/230 |
| 6,030,155 A | 2/2000 | Scheer et al. | |
| 6,132,149 A * | 10/2000 | Howarth et al. | 408/230 |
| 6,250,857 B1 * | 6/2001 | Kersten | 408/230 |
| 2002/0044843 A1 | 4/2002 | Suzuki et al. | |
| 2003/0012613 A1 | 1/2003 | Takiguchi et al. | |
| 2003/0039522 A1 | 2/2003 | Yangida et al. | |

FOREIGN PATENT DOCUMENTS

| | | |
|---|---|---|
| EP | 0 549 548 | 6/1993 |
| JP | 62-188614 | 8/1987 |
| JP | 62-147415 | 9/1987 |
| JP | 63-89210 | 4/1988 |
| JP | 63-201009 | 12/1988 |
| JP | 3-79212 | 8/1991 |
| JP | 4-210315 | 7/1992 |
| JP | 5-60715 | 8/1993 |
| JP | 6-91416 | 4/1994 |
| JP | 6-108253 | 4/1994 |
| JP | 6-182613 | 7/1994 |
| JP | 6-297219 | 10/1994 |
| JP | 6-312319 | 11/1994 |
| JP | 7-40117 | 2/1995 |
| JP | 8-155713 | 6/1996 |
| JP | 08155713 A * | 6/1996 |
| JP | 08229720 A * | 9/1996 |
| JP | 9-500335 | 1/1997 |
| JP | 9-150353 | 6/1997 |
| JP | 9-277108 | 10/1997 |
| JP | 2000-52119 | 2/2000 |
| JP | 2000263307 A * | 9/2000 |
| JP | 2002-301616 | 10/2002 |
| JP | 2004195559 A * | 7/2004 |
| WO | WO 95/13894 | 5/1995 |

* cited by examiner

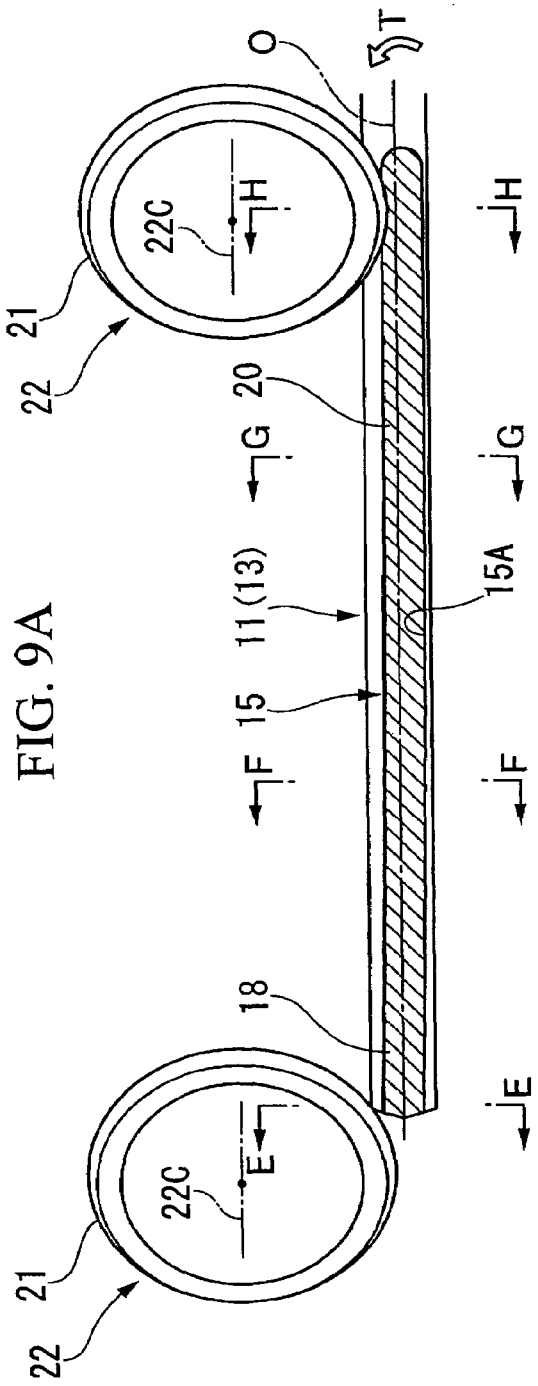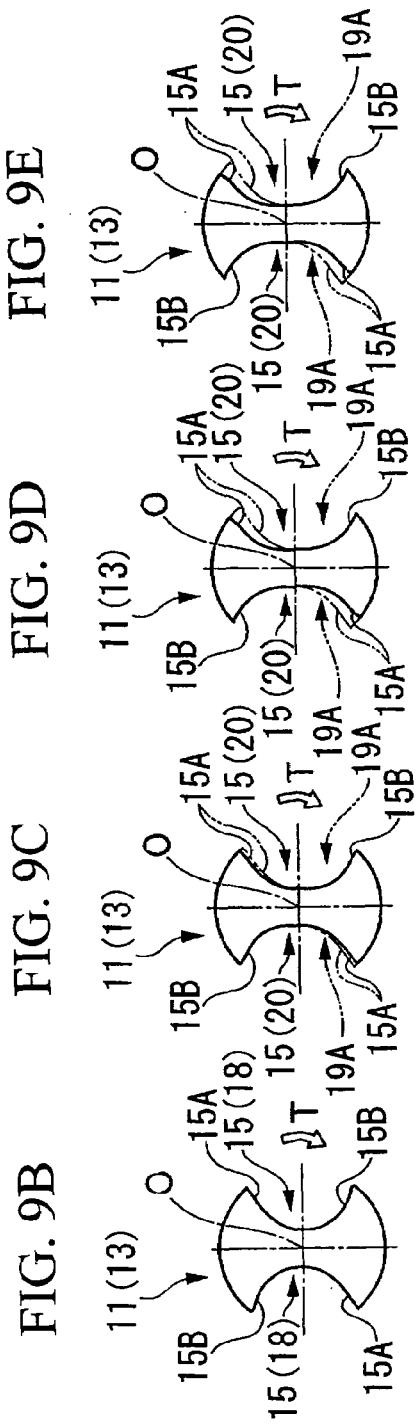

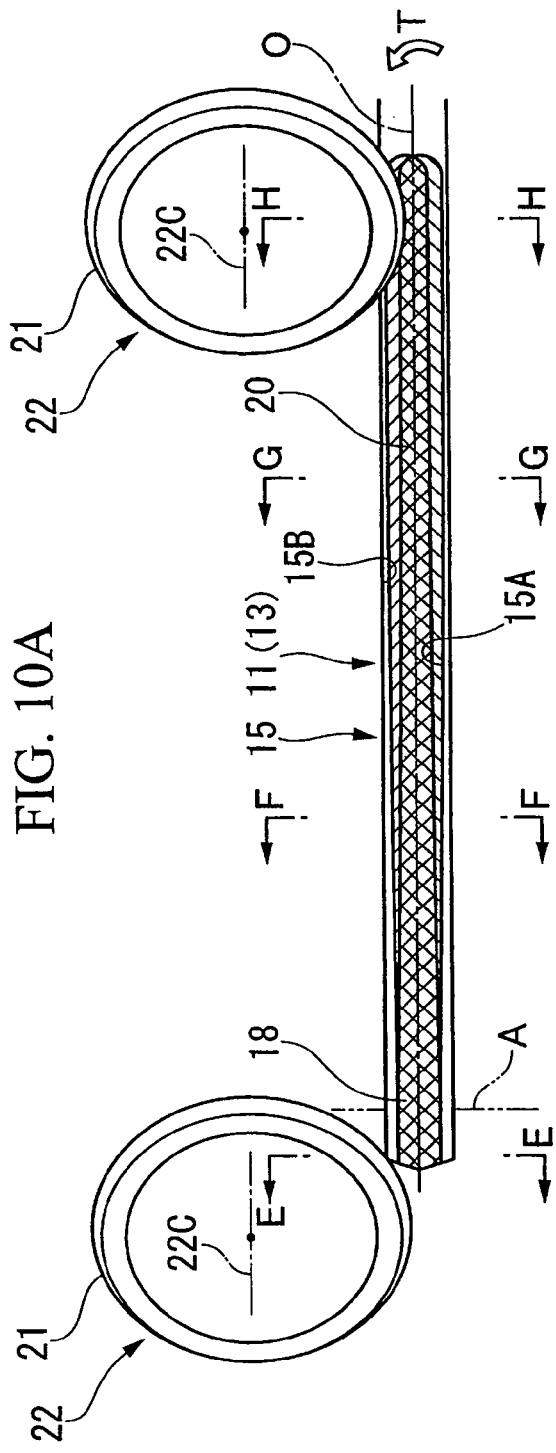

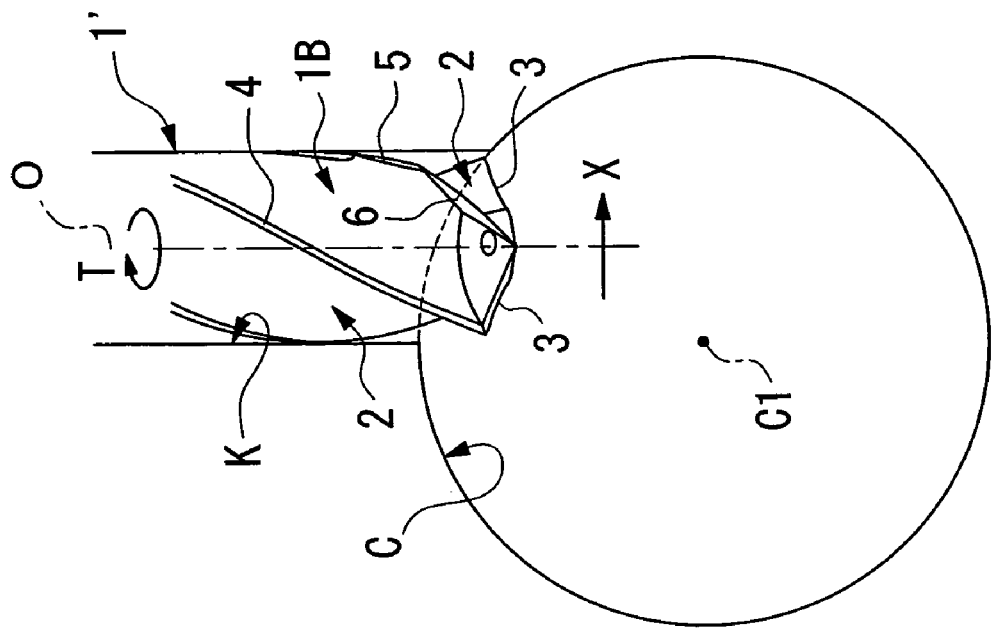
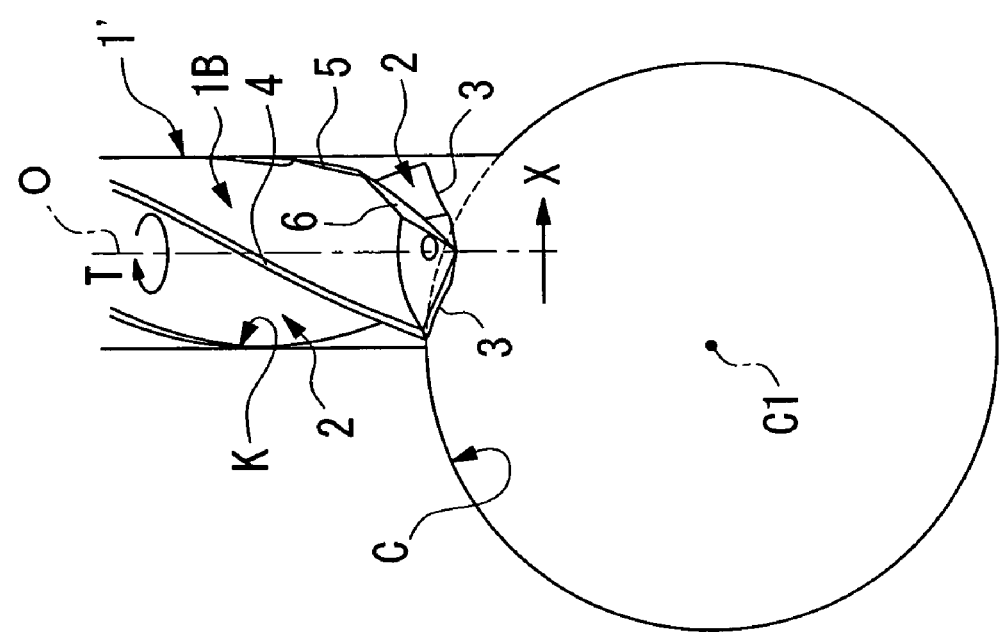
FIG. 27A
FIG. 27B

DRILL WITH GROOVE WIDTH VARIATION ALONG THE DRILL AND DOUBLE MARGIN WITH A THINNING SECTION AT THE TIP

BACKGROUND OF THE INVENTION

1. Field of the Invention

The present invention relates to a drill, in which a spiral-shaped chip discharge groove is formed in the outer periphery of the tip section of the drill body, and a production method thereof. In addition, the present invention relates to a drill used for hole drilling in order to form a machined hole at a high level of hole positioning accuracy in a drilled material, and for example, relates to a drill for forming a deep machined hole in a metal material.

2. Background Art

As shown in FIG. 22 through FIG. 24, a known example of a drill (solid drill) in which a spiral-shaped chip discharge groove is formed in the outer periphery of the end section of the drill body is a so-called two-flute twist drill in which a pair of chip discharge grooves 2, which twist to the rear in the direction of rotation of the drill around an axis O towards the rear end from the tip flank of the drill body, are formed symmetrically in the outer periphery of the tip section of a roughly cylindrical drill body 1 that rotates around axis O, and a cutting edge 3 is formed on the intersecting ridge line section between the wall surfaces of these chip discharge grooves 2 facing in the direction of drill rotation T and the aforementioned tip flank. In this type of twist drill, as is indicated in, for example, Japanese Unexamined Utility Model Application, First Publication No. 5-60715, by gradually increasing the groove width of chip discharge grooves 2 from $W_1$ to $W_2$ ($>W_1$) from point A to point B when the outer diameter of the drill is taken to be D and the distance to point A roughly 2D away from the tip of the bit section is taken to be $W_1$, and making it $W_2$ at the section extending from point B to the rear end of the bit section, clogging of chips in the rear end side of chip discharge grooves 2 is prevented, thereby serving to improve the discharge of chips.

In addition, a double margin type drill like that indicated in Japanese Unexamined Patent Application, First Publication No. 7-40117 is known as an example of this type of drill. In this drill, as shown in FIGS. 25 and 26, cutting edge 3 is formed on the intersecting ridgeline section between wall surfaces 2A facing the side of chip discharge grooves 2 in the direction of drill rotation T and tip flank 1A of drilling end 1' that rotates around axis O, adjacent first and second margin sections 4 and 5, which are adjacent to the rear and front sides in the direction of drill rotation T of chip discharge grooves 2, are respectively formed in land section 1B of drilling end 1', and these first and second margin sections 4 and 5 fulfill the role guiding drilling end 1' by contacting the inner wall surface of the machined hole that is formed.

In addition, thinning sections 6 are formed on the tip sides of the inner wall surfaces of chip discharge grooves 2 that are continuous with the inner peripheral edge of cutting edge 3 and is comprised by cutting out a region that extends to land section 1B, including heel section 1C of drilling end 1', and chips generated by cutting edge 3 are curled by this thinning section 6, thereby serving to improve the discharge of chips.

However, in the drill shown in FIGS. 22 through 24, in the case of gradually increasing the groove width of chip discharge grooves 2 from point A towards point B, as shown in FIG. 22, groove width is increased by extending wall surface 2A facing towards the side of chip discharge grooves 2 in the direction of drill rotation T from the tip side at a fixed helix angle, while widening the wall surface on the opposite side of wall surface 2A, namely wall surface 2B (wall surface on the heel side) that faces towards the rear side of cutting release grooves 2 in the direction of drill rotation T, to the side in the direction of drill rotation T. However, since chips discharged through chip discharge grooves 2 twisted into a spiral shape in this manner are sent to the rear end side while sliding over wall surface 2A so as to be pushed against wall surface 2A facing in the direction of drill rotation T, there is the possibility of the discharge of chips being inadequate simply by widening the side of wall surface 2B on the opposite side of wall surface 2A.

In addition, normally in the production of a drill having chip discharge grooves 2 twisted into a spiral shape in the outer periphery of the tip section of drill body 1, the aforementioned outer periphery is cut into the outer periphery of the tip section of drill body 1 by applying a fixed deflection angle to a grindstone so that the plane that intersects with the center line of the grindstone follows along the direction of twisting of the chip discharge grooves 2 in the case of viewing drill body 1 from the outside in the radial direction, while rotating the disc-shaped grindstone in which an abrasive particle layer is formed on the outer peripheral section around the aforementioned center line, and drill body 1 is then moved along axis O according to the aforementioned helix angle while rotating around axis O (normally the center line of the grindstone is fixed, and drill body 1 is moved along axis O while rotating). As a result, the wall surfaces 2A and 2B are ground to a predetermined shape by the abrasive particle layer resulting in the formation of chip discharge groove 2. In this type of production method, in order to widen the groove width of chip discharge groove 2 to the side of drill direction of rotation T at the rear end side, first grinding is performed over the entire length of chip discharge groove 2 by setting the grindstone to a predetermined deflection angle, and wall surface 2A is formed facing towards the direction of drill rotation T. Next, after shifting the grindstone from the location of the aforementioned point A towards the direction of drill rotation T while maintaining the same deflection angle, drill body 1 is again moved to the rear end side along axis O according to the aforementioned helix angle while rotating around axis O to form wall surface 2B.

However, in this production method, at least two steps are required for respectively grinding wall surfaces 2A and 2B in order to form chip discharge groove 2. In addition, in the case of using the same grindstone for both of these steps, there is the possibility of ridge sections R having a peak-shaped cross-section being formed between the side of wall surface 2A ground in the first step and the side of wall surface 2B ground in the subsequent step in the rear end side from the aforementioned point A as indicated with the broken line in FIG. 24. If this type of ridge section R remains, since the quality of discharge decreases due to chips becoming caught on this ridge section, an additional step is required to remove this ridge section R, thereby resulting in a considerable decrease in drill production efficiency.

In addition, in the case of a conventional double margin type drill, when viewed from the tip side in the direction of axis O as shown in FIG. 25, second margin section 5, which is formed so as to be adjacent to the front side in the direction of drill rotation T of chip discharge groove 2 in land section 1B of drilling end 1', is only present in the extremely small region facing towards the front side in the direction of drill rotation T from heel section 1C of drilling end 1'. Consequently, in the case of having formed a large thinning section 6 that reaches to land section 1B that includes heel section 1C, as shown in FIG. 26, the tip of second margin section 5 recedes considerably towards the rear end side by the amount thinning section 6 is formed, thereby making the distance along axis O between the tip of first margin section 4 and the tip of second margin section 5 extremely large.

However, as shown in FIGS. 27A and 27B, machining in which a machined hole K to be formed is opened towards a position shifted from center C1 of a cross hole C in the cross hole C formed in advance in a drilled material is an example of drilling using a double margin type of drill. In this case, when drilling end 1' passes through to the inner wall surface of cross hole C, force is applied in the horizontal direction (direction X in the drawing) that intersects with axis O to the tip section of drilling end 1'. However, in the case of a conventional double margin type drill as was previously described, since second margin section 5 is made to recede considerably towards the rear end side due to the presence of thinning section 6, second margin section 5 is unable to make contact with the inner wall surface of the exit section of the formed machined hole K for a short time after drilling end 1' passes through the inner wall surface of cross hole C (the time until the feed amount to the tip side in the direction of axis O imparted to drilling end 1 becomes the aforementioned distance h). As a result, even though first and second margin sections 4 and 5 were formed to guide drilling end 1' in a stable manner, during this time, drilling end 1' is only guided by first margin section 4, thereby causing to be guided in an unstable manner.

Consequently, drilling end 1' is unable to be guided in a stable manner with respect to force from direction X in FIGS. 27A and 27B, resulting in the occurrence of runout in drilling end 1' and causing problems such as increased surface roughness of the inner wall surface of the formed machined hole K or chipping cutting edge 3 due to contact with the wall surface of machined hole K (and breaking drilling end 1' in cases of particularly excessive runout).

In addition, in the case of conventional drills, wear resistance may be improved by covering the surface of drilling end 1' (including the surfaces of tip flank 1A of drilling end 1', land section 1B and the inner wall surfaces of chip discharge grooves 2) with a hard coating such as TiN or TiCN.

However, since the surface roughness of these hard coatings is comparatively large at 2-4 μm, if first and second margin sections 4 and 5 that contact the inner wall surface of machined hole K are covered with a hard coating having such a large surface roughness, the surface roughness of the inner wall surface of machined hole K increases accompanying contact with first and second margin sections 4 and 5. In particular, the increase in surface roughness on the inner wall surface of machined hole K becomes prominent in the initial stage of drilling during which there is the absence of the phenomenon in which the surface roughness of first and second margin sections 4 and 5 becomes smaller due to fraction with the inner wall surface of machined hole K. In addition, although chips generated by drilling are fed out and discharged to the rear end side while sliding over the inner peripheral surface of the chip discharge groove 2 from the rake face that is located on the tip side of the section that faces towards the front in the direction of drill rotation T, if the inner peripheral surface of chip discharge groove 2 is covered with a hard coating having a comparatively large surface roughness as mentioned above, resistance increases and the quality of chip discharge decreases. As a result, chips are easily clogged in chip discharge groove 2, and when this clogging becomes prominent, it may lead to breakage of drilling end 1'.

Moreover, the drilling of deep holes, which had been conventionally performed with a gun drill, has recently come to be frequently performed using a type of drill in which the total length of bit section 1' extends to 10×D to 20×D, and even 25×D depending on the particular case, with respect to external diameter D of the drill in order to improve drilling efficiency. However, in the case of a drill such as this for drilling deep holes in which the total length of bit section 1' is long, since the distance over which chips generated by cutting edge 3 are discharged through chip discharge groove 2 also becomes longer, chips easily become clogged in chip discharge groove 2. Moreover, since drill rigidity and strength also tend to decrease as the total length of bit section 1' increases, the drill is increasingly susceptible to breakage due to clogging of chips in chip discharge groove 2.

Moreover, in the case of conventional drills, back tapers are attached to first and second margin sections 4 and 5 that contact the inner wall surface of machined hole K so that the outer diameter of drilling end 1' gradually decreases at a constant ratio moving towards the rear end side in order to reduce the contact surface area with the inner wall surface and decrease drilling resistance.

However, since back tapers are attached over the entire length of drilling end 1', when large back tapers are attached in order to impart adequate clearance to the outer peripheral surface of drilling end 1', the outer diameter of drilling end 1' becomes smaller than necessary at its rear end section, thereby causing the problem of decreased rigidity of drilling end 1'. This is particularly conspicuous in the case of a drill used for forming deep machined holes, namely a drill in which the total length of drilling end 1' is long.

On the basis of this background, an object of the present invention is to provide a drill that reliably and further improves the discharge of chips while effectively preventing the clogging of chips, while also providing a production method of a drill that enables such a drill to be produced without decreasing production efficiency.

In addition, an object of the present invention is to provide a drill that allows the obtaining of stable guiding action for the drilling end by first and second margin sections even in the case of a double margin type drill in which a large thinning section is formed.

In addition, an object of the present invention is to provide a drill capable of preventing the clogging of chips and drill breakage by decreasing resistance during chip discharge, while also being capable of reducing the surface roughness of the inner wall surface of a machined hole formed by drilling, even in the case of having improved wear resistance by covering the surface of the drilling end with a hard coating.

SUMMARY OF THE INVENTION

In order to achieve the aforementioned objects, the present invention is characterized by being a drill comprising: a chip discharge groove twisted in the shape of a spiral relative to an axis that is formed in the outer periphery of the tip section of a roughly cylindrical drill body that rotates around the axis, and a cutting edge formed on the intersecting ridgeline between a wall surface facing in the direction of drill rotation of this chip discharge groove and a tip flank of the drill body; wherein, together with the section on the tip side of the chip discharge groove continuous with the cutting edge being a narrow width section in which the helix angle relative to the axis and groove width are constant, a wide width section is formed in the chip discharge groove farther towards the rear end than this narrow width section, in which the helix angle is equal to the narrow width section and in which the groove width is widened relative to the narrow width section in the direction of drill rotation and towards the rear in the direction of drill rotation and has a constant width.

According to this drill, together with the chip discharge groove being widened towards the direction of drill rotation relative to the narrow width section on the tip side in the wide width section, since it is also widened towards the rear in the direction of drill rotation, chips located towards the rear in the direction of drill rotation of this chip discharge groove that slide through while pressing against the wall surface facing in the direction of drill rotation can be reliably fed to the rear end side and discharged.

Here, in order to facilitate the smooth discharge of chips from the narrow width section on the tip side of this chip discharge groove to the wide width section of the rear end side, it is preferable to form an expanding width section in which the groove width of the chip discharge groove gradually becomes larger moving towards the rear end, and at this time, the boundary between this expanding width section and the narrow width section is preferably located within the range of 3-5×D relative to outer diameter D of the cutting edge from the outer peripheral edge of the cutting edge towards the rear end side in the axial direction. If the location of this boundary is farther towards the tip than this range, the proportion of section where the groove width is large of the chip discharge groove extending from the expanding width section farther towards the rear end side to the wide width section becomes excessively large, resulting in a decrease in thickness of the drill body and insufficient rigidity, thereby resulting in the possibility of increased susceptibility to breakage during drilling. Conversely, if the location of the boundary is farther towards the rear end side than the above range, the length of the narrow width section of the chip discharge groove farther towards the tip becomes long, resulting in the possibility of chips becoming clogged in this narrow width section.

In addition, the present invention also provides a drill production method for producing a drill having the constitution described above. In this method, by causing the outer periphery of a disk-shaped grindstone on which an abrasive particle layer is formed on the outer periphery to cut into the outer periphery of the tip section of a drill body by applying a fixed deflection angle to the grindstone so that a plane that intersects with the center line of the grindstone lies along the direction of twisting of the chip discharge groove in the case of viewing the drill body from the outside in the radial direction while rotating the grindstone around the center line, and moving the drill body along its axis by twisting while rotating about that axis, in the forming of the chip discharge groove by the abrasive particle layer, the angle of deflection of the grindstone is made to be larger on the rear end side than the section on the tip side of the chip discharge groove that is continuous with the cutting edge.

In this drill production method, when attempting to grind the wall surfaces of the chip discharge groove by, for example, moving the drill body towards the tip side in the axial direction while rotating around the axis, by making the angle of deflection of the grindstone larger at an intermediate point of the movement of the drill body towards the tip side in the axial direction, both wall surfaces of the chip discharge groove can be ground by a larger amount on the rear end side of the drill body than the tip side. As a result, the chip discharge groove of a drill as described above can be formed in a single grinding step, and the formation of ridges in the chip discharge groove can be prevented.

In addition, the present invention is also characterized by being a drill comprising: a chip discharge groove in the shape of a spiral relative to an axis that is formed in the outer periphery of the tip section of a roughly cylindrical drill body that rotates around the axis, and a cutting edge formed on the intersecting ridgeline between a wall surface facing in the direction of drill rotation of this chip discharge groove and a tip flank of the drill body; wherein, together with the section on the tip side of the chip discharge groove continuous with the cutting edge being a narrow width section in which the helix angle relative to the axis and groove width are constant, an expanding width section is formed in the chip discharge groove farther towards the rear end side than the narrow width section in which groove width is gradually widened in the direction of drill rotation and towards the rear in the direction of drill rotation as it approaches the rear end side relative to a virtual groove in which the narrow width section is extended towards the rear end.

According to this drill, together with the chip discharge groove in the expanding width section being widened towards the direction of drill rotation relative to the narrow width section on the tip side, groove width is gradually increased so that the chip discharge groove is also widened towards the rear in the direction of drill rotation. Thus, chips that slide through while pressing against the wall surface towards the direction of drill rotation by being located on the rear side in the direction of drill rotation of the chip discharge groove can also be reliably fed to the rear end side and discharged.

In this case as well, the boundary between the narrow width section and the expanding width section is preferably located within the range of 3-5×D relative to outer diameter D of the cutting edge from the outer peripheral edge of the cutting edge towards the rear end side in the axial direction.

Furthermore, if the groove width of the chip discharge groove is left gradually increased by the expanding width section on the rear end side of the chip discharge groove., in the case, for example, the length in the axial direction of the tip section of the drill body in which a chip discharge groove is formed in the aforementioned two-flute twist drill is long, there is the possibility of both chip discharge grooves overlapping at the rear end section of this chip discharge groove. Consequently, the groove width of the chip discharge groove may be again be made to be fixed at a size that is wider than the narrow width section on the rear end side of the expanding width section. In addition, this expanding width section may also be composed by a plurality of stages of expanding width sections in which the ratio by which the groove width expands towards the rear end side differs. In this case, it is preferable that the expanding width section of the stage on the tip side have a larger expanding ratio than the rear end side in order to ensure reliable discharge of chips from the narrow width section.

In addition, the present invention also provides a drill production method for producing a drill having the aforementioned constitution. In this method, by causing a disk-shaped grindstone on which an abrasive particle layer is formed on the outer periphery to cut into the outer periphery of the tip section of a drill body so that the peripheral section lies along the direction of twisting of the chip discharge groove while rotating the grindstone around its center line, and moving the drill body in the axial direction towards the direction of twisting while rotating around the axis relative to the grindstone, in the forming of the chip discharge groove by the abrasive particle layer, in the section serving as the expanding width section of the chip discharge groove, the drill body is respectively moved while rotating relative to the grindstone at a speed greater than and a speed less than the relative rotational movement speed of the drill body relative to the grindstone in the section serving as the narrow width section.

In this drill production method, by performing at least two grinding steps at speeds greater than and less than the relative rotational movement speed of the drill and grindstone when forming the narrow width section, in the case of grinding in which the relative rotational movement speed has been increased, a spiral groove is formed having a helix angle larger than the narrow width section, and its groove width is gradually widened towards the rear in the direction of drill rotation as it approaches the rear end side. On the other hand, in the case of grinding in which the relative rotational movement speed has been decreased, a spiral groove is formed having a helix angle smaller than the narrow width section, and its groove width is gradually widened in the direction of drill rotation as it approaches the rear end side. As a result, an expanding width section is formed in which these spiral grooves overlap, and the groove width is gradually widened in the direction of drill rotation and its rear side as it approaches the rear end side with respect to the virtual groove extending from the narrow width section. In an expanding width section formed in this manner, even if a ridgeline section is formed at the section where the spiral grooves overlap, the height of this ridgeline section gradually decreases towards the tip side. Thus, there is little possibility of chips discharged from the narrow width section becoming caught, and even if this ridgeline section is to be removed, it can be removed easily.

In addition, the present invention is also characterized by being a drill comprising: a chip discharge groove extending towards the rear end side formed in the outer periphery of a drilling end section that is the section on the tip side of a drill body that rotates around an axis, a cutting edge is formed on the intersecting ridgeline section between an inner wall surface that faces towards the front in the direction of drill rotation of the chip discharge groove and the tip flank of the drilling end section, and a first margin section, which is adjacent to the rear side in the direction of drill rotation of the chip discharge groove, and a second margin section, which is adjacent to the front side in the direction of drill rotation of the chip discharge groove, are formed in a land section of the drilling end section; wherein, a thinning section is formed on the tip side of the inner wall surface of the chip discharge groove that is continuous with the inner peripheral edge of the cutting edge and extends to the land section, and when the drilling end section is viewed from the tip side in the axial direction, the intersecting angle between a straight line X, which connects a point in the second margin section located the farthest towards the front in the direction of drill rotation and the axis, and a straight line Y, which connects the outer peripheral edge located in the land section at the intersecting ridgeline between the tip flank and thinning section and the axis, is set to be within the range of $-5°$ to $10°$ when straight line X is taken to be positive when located farther towards the front in the direction of drill rotation than straight line Y.

According to this drill, as a result of positioning the second margin section when viewed from the tip side in the axial direction so that the point located the farthest towards the front in the direction of drill rotation satisfies the range described above, even if the thinning section is formed over a large region that extends to the land section of the drilling end section, the tip in the axial direction of the second margin section is able to approach the tip in the axial direction of the first margin section, thereby making it possible to reduce the distance in the axial direction between the tip of the first margin section and the tip of the second margin section.

As a result, even in the case of, for example, forming a machined hole so as to pass through the inner wall surface of a cross hole on an incline, since both the first margin section and second margin section are able to make contact with the inner wall surface of the exit section of the machined hole that is formed when the drilling end section passes through the cross hole, the first and second margin sections are able to demonstrate the action of stable guidance of the drilling end section.

In this case, together with a hard coating covering the surface of the drilling end section, polishing is preferably performed on the surfaces of at least the first margin section and the second margin section.

When composed in this manner, a hard coating having a comparatively coarse surface roughness is coated onto the surface of the drilling end section to improve the wear resistance of the drilling end section, while polishing is performed on the surface of the margin sections that contact the inner wall surface of a machined hole that is formed, thereby also making it possible to maintain a low level of surface roughness. Thus, the inner wall surface roughness of a machined hole is not unnecessarily worsened.

In addition, the drilling end section is preferable composed of a back taper section, at which the outer diameter of the drilling end section gradually decreases moving towards the rear end side in the axial direction, and a straight section, in which the outer diameter of the drilling end section is roughly constant along the axial direction.

When composed in this manner, a back taper can be provided for the back taper section that serves as the tip side section of the drilling end section that is able to adequately ensure clearance with respect to its outer peripheral surface. Moreover, in the straight section that is continuous with the rear end side of the back taper section and serves as the rear end side section of the drilling end section, since the outer diameter is maintained roughly constant and does not become smaller than the outer diameter at the rear end of the back taper section, the rigidity of the drilling end section does not decrease excessively.

In addition, the present invention is characterized by being a drill comprising: a chip discharge groove extending towards the rear end side formed in the outer periphery of a drilling end section which is the tip side section of a drill body that rotates around an axis, and a cutting edge formed on an intersecting ridgeline section between an inner wall surface facing towards the front in the direction of drill rotation of the chip discharge groove and a tip flank of the drilling end section; wherein, together with a hard coating covering the surface of the drilling end section, polishing is performed on the surface of at least a margin section formed on a land section of the drilling end section.

According to this drill, a hard coating having a comparatively coarse surface roughness is coated onto the surface of the drilling end section to improve the wear resistance of the drilling end section, while polishing is performed on the surface of a margin section that contacts the inner wall surface of a machined hole that is formed, thereby also making it possible to set surface roughness to a low level and prevent excessive worsening of the inner wall surface roughness of a machined hole.

In this case, in consideration of the effect of preventing worsening of inner wall surface roughness of a machined hole and the time and trouble involved in polishing, the surface roughness Ra of a margin section on which polishing has been performed is preferably set to within the range of 0.1 μm to 0.3 μm.

Moreover, in this drill, polishing is also preferably performed on the inner peripheral surface of the chip discharge groove after covering with the hard coating. In such a drill, since the surface of the inner peripheral surface of the chip discharge groove is smoothened by polishing after covering with a hard coating having a coarse surface roughness, there is little fractional resistance during sliding contact by the chips, and chips are discharged smoothly by being pushed out towards the rear end side, thereby preventing the occurrence of clogging of the chips.

This polishing is carried out by polishing the inner peripheral surface of the chip discharge groove with a brush coated with an abrasive such as diamond paste. The surface roughness of the inner peripheral surface of the chip discharge groove polished in this manner is preferably within the range of 0.5-1.5 μm in the direction in which the chip discharge groove extends, and within the range of 1.0-2.0 μm in the circumferential direction of the inner peripheral surface. The greater the surface roughness exceeds the above ranges, the less the effect of reducing friction generated by sliding contact of the chips, and conversely, the greater the surface roughness falls below the above ranges, the greater the amounts of time and labor required for polishing. In addition, it is preferable that the surface roughness on the inner peripheral surface of the polished chip discharge groove as measured in the direction in which the chip discharge groove extends be smoother than the surface roughness as measured in the circumferential direction of the inner peripheral surface.

BRIEF DESCRIPTION OF THE DRAWINGS

FIG. 9A is a virtual side view of a chip discharge groove having been extended in a straight line when grinding the wall surface in another embodiment of the drill production method of the present invention.

FIG. 9B is a cross-sectional view taken along E-E in FIG. 9A.

FIG. 9C is a cross-sectional view taken along F-F in FIG. 9A.

FIG. 9D is a cross-sectional view taken along G-G in FIG. 9A.

FIG. 9E is a cross-sectional view taken along H-H in FIG. 9A.

FIG. 10A is a virtual side view of a chip discharge groove having been extended in a straight line when grinding the wall surface in another embodiment of the drill production method of the present invention.

FIG. 10B is a cross-sectional view taken along E-E in FIG. 10A.

FIG. 10C is a cross-sectional view taken along F-F in FIG. 10A.

FIG. 10D is a cross-sectional view taken along G-G in FIG. 10A.

FIG. 10E is a cross-sectional view taken along H-H in FIG. 10A.

FIG. 27A is an explanatory drawing showing the state of drilling using a drill of the prior art.

FIG. 27B is an explanatory drawing showing the state of drilling using a drill of the prior art.

DESCRIPTION OF THE PREFERRED EMBODIMENTS

Figure 1:
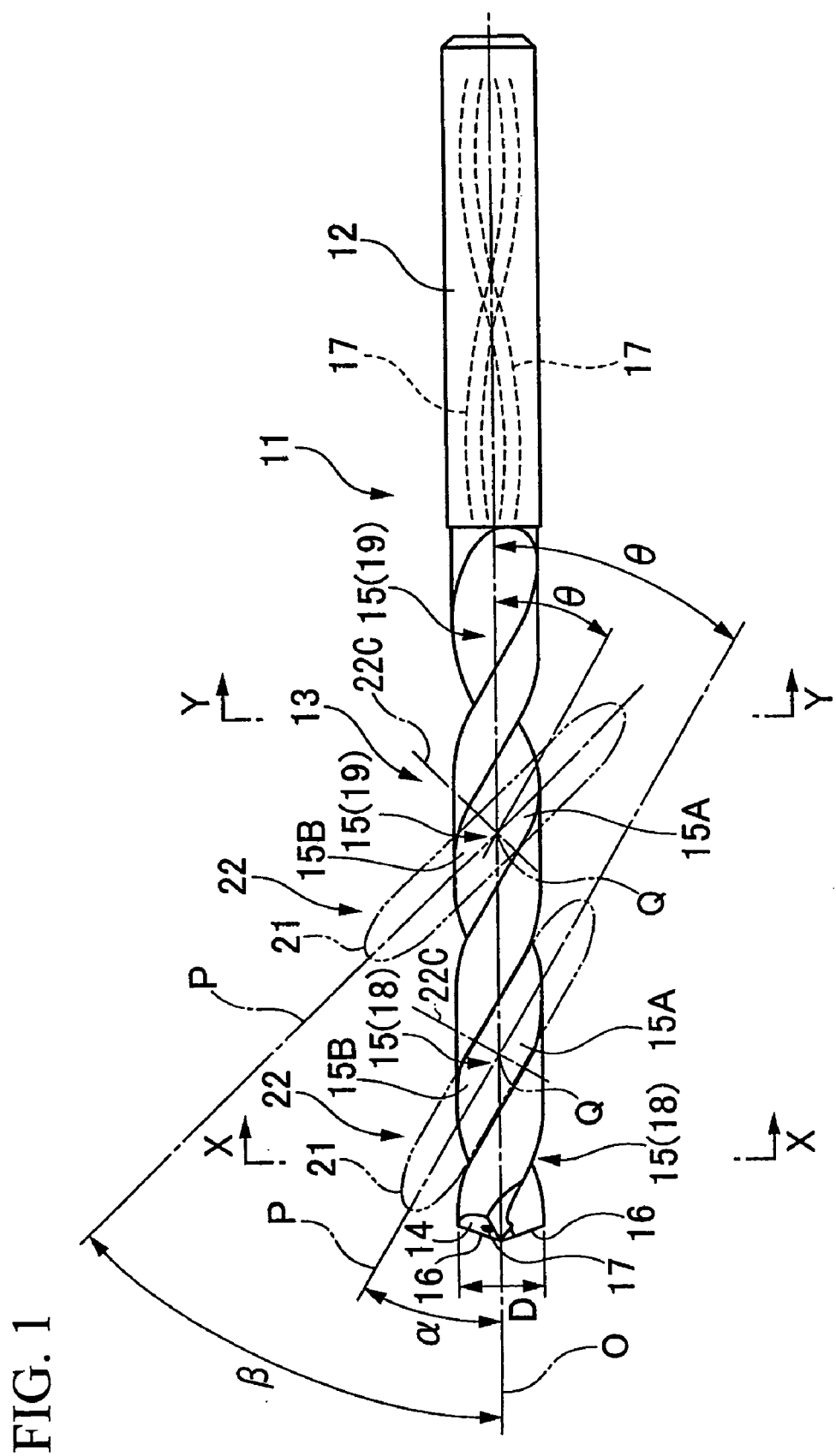
FIG. 1 is a side view of a drill that explains one embodiment of the drill of the present invention and one embodiment of the drill production method of the present invention during production of this drill.

The following provides an explanation of preferable embodiments of the present invention along with their drawings.

FIGS. 1 through 4 explain an embodiment of the drill of the present invention and an embodiment of the drill production method of the present invention during production of this drill. In these drawings, a drill body 11 is formed from a hard material such as cemented carbide, has a roughly cylindrical shape centering around an axis O, and together with its rear end section (end section on the right side in the drawings) serving as a shank section 12, the tip section is in the form of a cutting edge section 13 having a slightly smaller diameter than this shank section 12. Moreover, a pair of chip discharge grooves 15 are formed in the outer periphery of cutting edge section 13 mutually symmetrically about axis O in a spiral shape that are twisted to the rear end side in the direction of drill rotation T during drilling while centered around axis O moving towards the rear end side, from a tip flank 14 on the tip of drill body 11 to immediately before shank section 12 towards the rear end side. The tip sides of wall surface 15A facing in the direction of drill rotation T of these chip discharge grooves 15 are in the form of rake faces, and cutting edges 16, extending from the inner peripheral side of tip flank 14 to the outer periphery of cutting edge section 13, are respectively formed in the ridgeline section that intersects with tip flank 14. In addition, a pair of supply holes 17 for supplying cutting oil and air are formed mutually symmetrically with respect to axis O, and so as to be twisted to the rear end side in the direction of drill rotation T centered around axis O moving towards the rear end side, within drill body 11 from the rear end of shank section 12 towards the tip side. These supply holes 17 are opened into tip flank 14 in cutting edge section 13 to as to avoid the chip discharge grooves 15.

The section on the tip side of chip discharge grooves 15 that is continuous with the cutting edge 16 is in the form of a narrow width section 18 in which helix angle θ relative to the axis O and groove width W are constant, and a wide width section 19 is formed in chip discharge grooves 15 farther towards the rear end side than this narrow width section 18 in which helix angle θ is equal to that of the narrow width section 18, and groove width W has a constant width that is wider than narrow width section 18 in the direction of drill rotation T and to the rear of direction of drill rotation T. In addition, an expanding width section 20 is formed between this narrow width section 18 and this wide width section 19 in which the groove width of chip discharge grooves 15 gradually becomes larger towards the rear end side, and a boundary A between this expanding width section 20 and the narrow width section 18 is set to be located within a range L of 3-5×D with respect to the diameter of a circle, namely outer diameter D of cutting edge 16, in which the outer peripheral edge of cutting edge 16 is formed around axis, from the outer peripheral edge of cutting edge 16 towards the rear end side in the direction of axis O. Furthermore, margin sections may be formed in the outer peripheral surface of cutting edge section 13 so as to follow along chip discharge grooves 15 in an opening edge section on the rear side in the direction of drill rotation T or in an opening edge section on the side in the direction of drill rotation of chip discharge grooves 15 formed in this manner.

Figure 2:
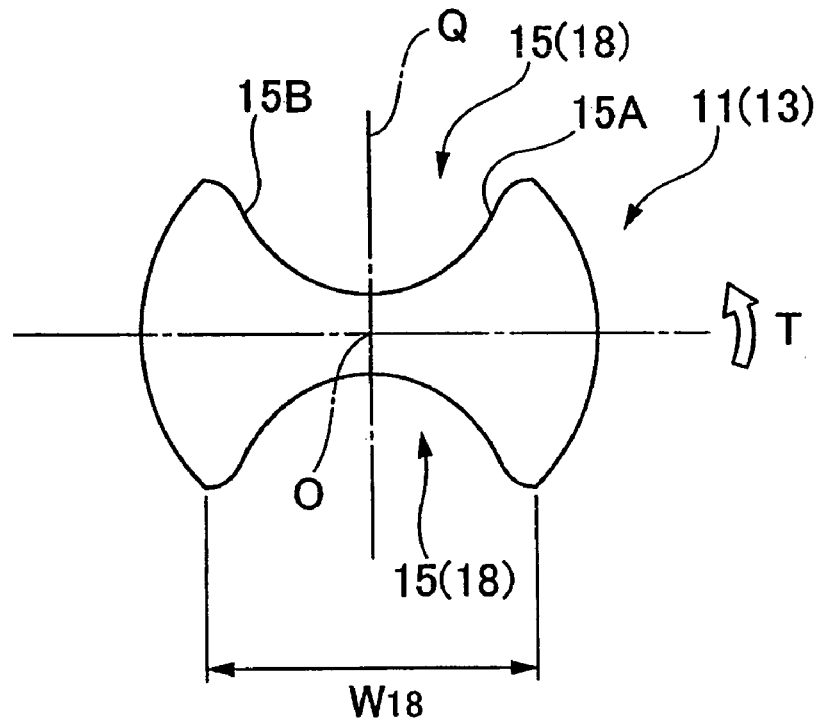
FIG. 2 is a cross-sectional view taken along X-X in FIG. 1.
Figure 3:
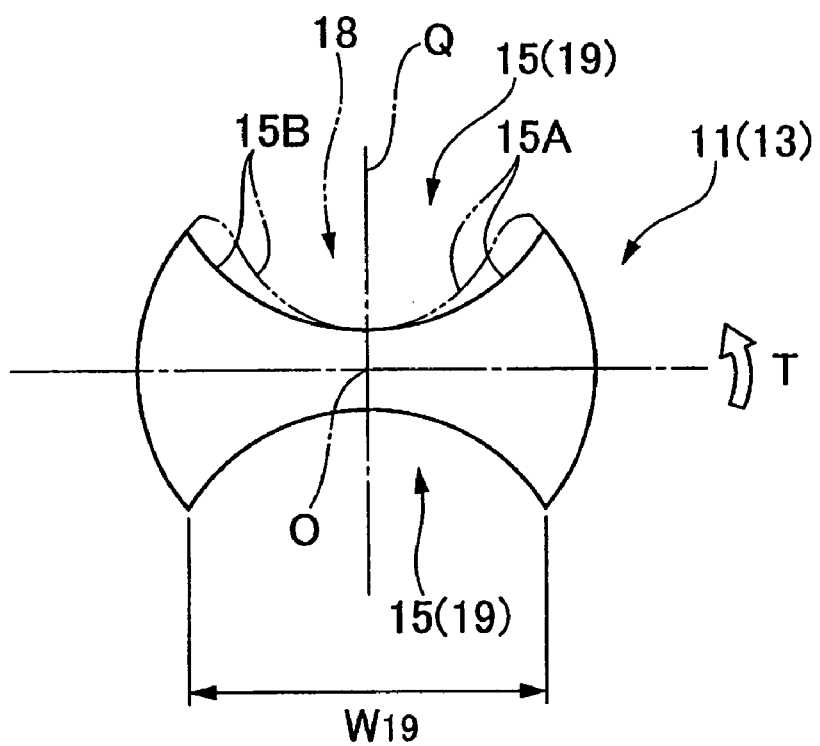
FIG. 3 is a cross-sectional view taken along Y-Y in FIG. 1.
Figure 4:
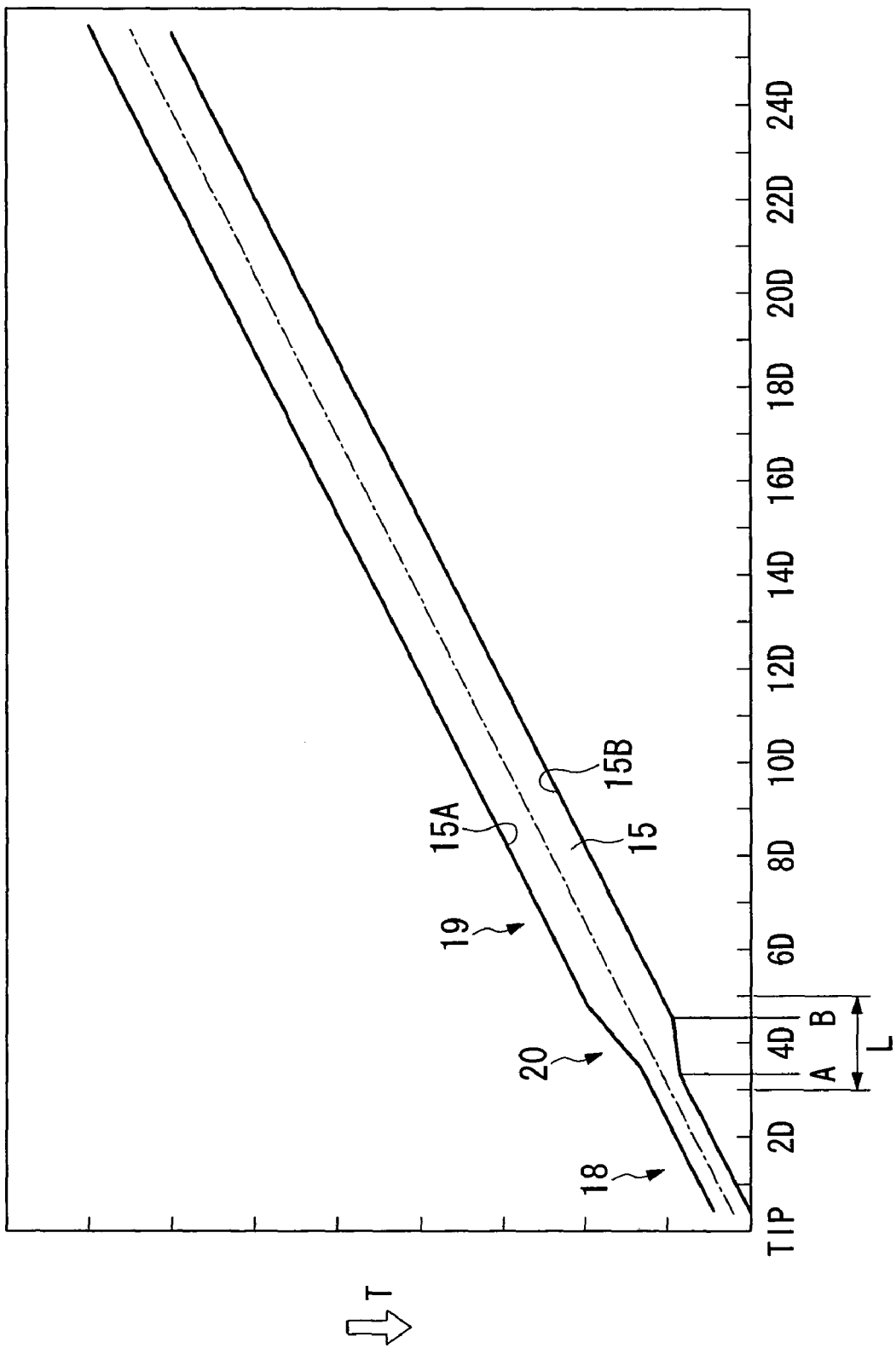
FIG. 4 is extension drawing of a chip discharge groove of the drill shown in FIG. 1.
Figure 5:
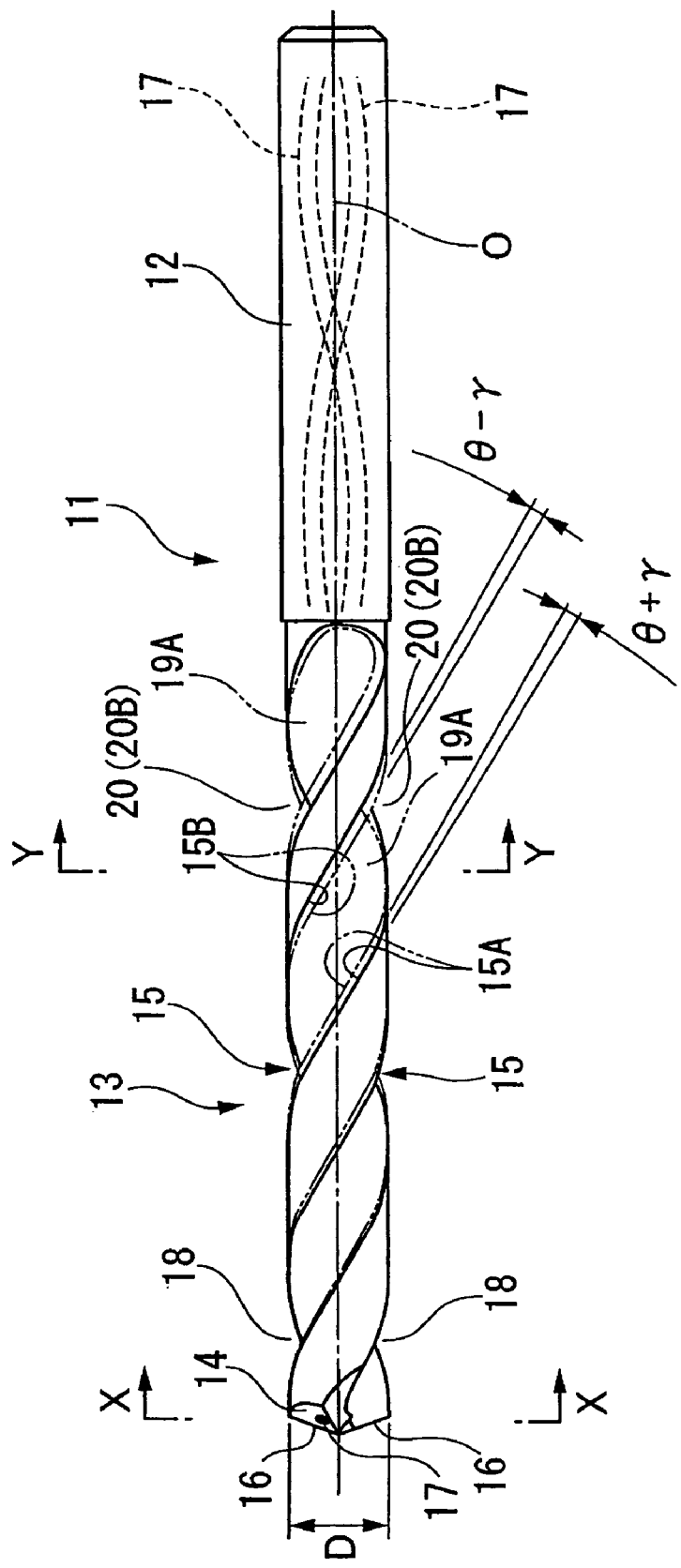
FIG. 5 is a side view of a drill showing another embodiment of the present invention.
Figure 6:
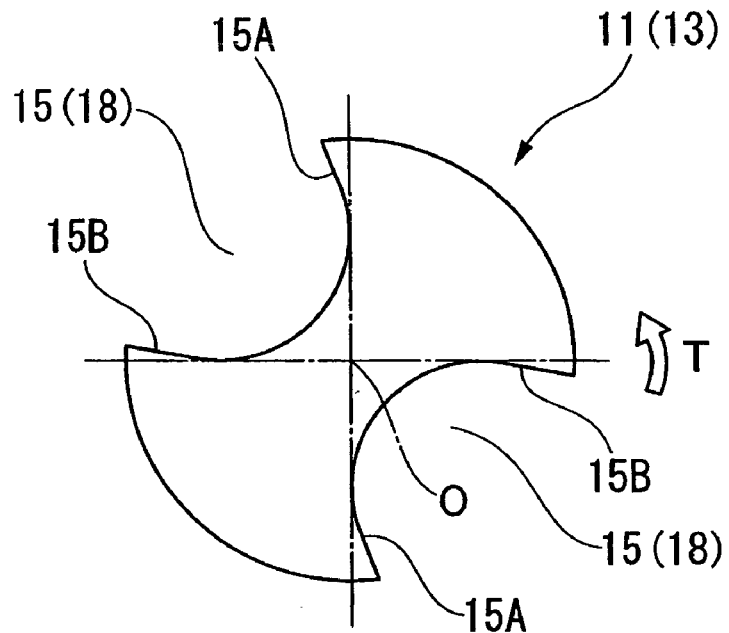
FIG. 6 is a cross-sectional view taken along X-X in FIG. 5.

In addition, chip discharge grooves 15 are formed so that the wall surface 15A facing in the direction of drill rotation T in the cross-section that intersects with axis O, and the wall surface 15B on the heel side facing towards the rear side in the direction of drill rotation T in opposition thereto, smoothly form a continuous curved shape as shown in FIGS. 2 and 3. Moreover, in the present embodiment, as shown in FIG. 3, as a result of the core thickness being the same as narrow width section 18 while making the radius of curvature of the curve larger than narrow width section 18 in wide width section 19, groove width W19 becomes larger than groove width W18. However, the core thickness may be larger than narrow width section 18 in this wide width section 19. In addition, FIG. 4 shows an extension drawing when a chip discharge groove 15 twisted into a spiral shape as previously described is extended in the direction of drill rotation T around axis O. As shown in FIG. 4, the groove width of this chip discharge groove 15 respectively increases at a constant ratio in the direction of drill rotation T and on its rear side with respect to groove width W18 moving from boundary A towards the rear end side of drill body 11, and becomes groove width W19 at boundary B between expanding width section 20 and wide width section 19. Moreover, in FIG. 4, a line that passes through the center of groove width W18 in narrow width section 18 and a line that passes through the center of groove width W19 in wide width section 19 are set to be continuous on the same line, and as a result, the angle formed with axis O by this line when drill body 11 is side-viewed firm the outer peripheral side in the radial direction with respect to axis O, namely helix angle θ of this chip discharge groove 15, is constant from narrow width section 18 to wide width section 19.

On the other hand, in the production method of the present embodiment, while rotating a disk-shaped grindstone 22, on which an abrasive particle layer 21 is formed on the outer peripheral section in the same manner as the prior art, around its center line 22C, when drill body 11 is side-viewed from the outer peripheral side in the radial direction with respect to axis O as shown in FIG. 1, the outer peripheral portion is made to cut into the outer periphery of the tip section of drill body 11 by applying an angle of deflection to grindstone 22 so that a plane P, which intersects with the center line 22C, lies along the direction of twisting of chip discharge groove 15, and drill body 11 is moved according to the aforementioned helix angle θ in the direction of axis O while relatively rotating around axis O with respect to grindstone 22. Whereupon, wall surfaces 15A and 15B are formed as a result of grinding by the abrasive particle layer 21. Furthermore, although drill body 11 is shown in FIG. 1 to be fixed while grindstone 22 is moved in the direction of axis O for the sake of facilitating the explanation, grinding is generally carried out by fixing the location of grindstone 22, and moving drill body 11 to the tip side in the direction of axis O while rotating around axis O. In addition, in the case drill body 11 is formed from cemented carbide and so forth, since a spiral groove to serve as the basic pattern for chip discharge grooves 15 is formed in advance in the tip section of drill body 11 prior to grinding, wall surfaces 15A and 15B are formed by inserting the outer peripheral section of grindstone 22 into this spiral groove and then causing it to cut into the outer periphery of the tip section of drill body 11.

In the present embodiment, together with forming the aforementioned narrow width section 18 in a section on the tip side, wide width section 19 is formed in a section on the ear end side by making the aforementioned angle of deflection of grindstone 22 larger than on the rear end side than the section on the tip side of chip discharge groove 15 continuous with the aforementioned cutting edge 16. Namely, when carrying out grinding by fixing the location of grindstone 22 as previously described and moving drill body 11 towards the tip side in the direction of axis O while rotating around axis O, by making angle of deflection a of the grindstone to be a fixed angle roughly equal to the aforementioned helix angle θ (and is actually made to be about +1° larger than helix angle θ) from tip flank 14 to the location of boundary A, and rotating grindstone 22 around a straight line Q that passes through axis O of drill body 11 and center line 22C of grindstone 22 in the aforementioned side view while moving drill body 11 towards the tip end side in the direction of axis O between boundary A and boundary B, this angle of deflection gradually becomes larger, eventually becoming angle of deflection $\beta$ that is larger than angle of deflection $\alpha$ at boundary B, after which it remains constant as angle of deflection $\beta$. As a result, accompanying the relative movement of drill body 11, the plane of projection of the plane that intersects axis O of the loci of the outer peripheral portion of grindstone 22 that passes through chip discharge groove 15 maintains the shape of a convex curve that forms a protrusion on the inner periphery of drill body 11 with respect to narrow width section 18 in wide width section 19, and is widened in the direction of drill rotation T and its rear side centered about straight line Q. As a result, wall surfaces 15A and 15B, which are ground by abrasive particle layer 21 formed on the outer peripheral section, maintain the shape of a curve having a concave cross-section that is mutually smoothly continuous with narrow width section 18 in wide width section 19, with wall surface 15A being widened on the rear side in the direction of drill rotation T, and wall surface 15B being widened on the side in the direction of drill rotation T.

In a drill having the constitution described above that has been produced according to this type of production method, groove width W19 of a chip discharge groove 15 in this wide width section 19 is widened on the side in the direction of drill rotation T with respect to narrow width section 18, and since it is also widened on the rear side in the direction of drill rotation T in opposition thereto, in addition to the clogging of chips naturally being prevented due to the increase in cross-sectional surface area of chip discharge groove 15 as a result groove width W19 being larger than groove width W18, chips that are fed out to the rear side by sliding over wall surface 15A so as to press against wall surface 15a on the rear side in the direction of drill rotation T accompanying rotation of drill body 11 during drilling are able to be discharged more smoothly, thereby making it possible to reliably prevent clogging of chips on the rear end side of cutting edge section 13. Namely, in contrast to chips sliding while pressing against wall surface 15A of chip discharge groove 15, since this wall surface 15A is made to recede to the rear side in the direction of drill rotation T in wide width section 19, in this wide width section 19, the pressing force with which chips passing through chip discharge groove 15 press against wall surface 15A is alleviated, thereby preventing the occurrence of a situation in which chips are compressed against each other, become entangled or become clogged due to this pressing force. As a result, the quality of chip discharge can be further improved by effectively utilizing the space within chip discharge grooves 15 in which the cross-sectional surface area has been enlarged in wide width section 19.

In addition, in the drill of the present embodiment, since the expanding width section 20, in which groove width gradually becomes wider towards wide width section 19, is formed between wide width section 19 of a chip discharge groove 15 and narrow width section 18 of cutting edge section 13, the groove width does not suddenly increase moving from narrow width section 18 towards wide width section 19. As a result, the discharge of chips, particularly those which slide over wall surface 15A, can be made to be even smoother. Moreover, since the boundary between expanding width section 20, which gradually becomes wider towards wide width section 19, and narrow width section 18 is located within the range of 3-5×D with respect to the outer diameter D of cutting edge 16 from the outer peripheral edge of cutting edge 16 towards the rear end side in the direction of axis O, even if wide width section 19 is formed, it does not result in inadequate rigidity of drill body 11, and the occurrence of breakage in cases such as when the length of cutting edge section 13 is extremely long relative to outer diameter D of cutting edge 16 can be avoided. On the other hand, the occurrence of clogging of chips in narrow width section 18 prior to reaching wide width section 19 and expanding width section 20, as a result of narrow width section 18 being excessively long on the tip side, can be prevented.

On the other hand, in the drill production method of the present embodiment, since it is only required to increase the angle of deflection of grindstone 22 during the course of grinding wall surfaces 15A and 15B by grindstone 22 in the formation step of chip discharge grooves in an ordinary drill as previously described, machining from narrow width section 18 through expanding width section 20 to wide width section 19 can be performed with a single passage of grindstone 22 in the direction of axis O with respect to a single chip discharge groove 15 due to the relative movement with drill body 11. Thus, a drill having the aforementioned constitution can be produced without impairing production efficiency. Moreover, in a drill produced in this manner, by changing the angle of deflection of grindstone 22 so that angle of deflection $\beta$ of wide width section 19 is larger than angle of deflection $\alpha$ in narrow width section 18, in this wide width section 19, groove width W19 is widened on the side in the direction of drill rotation T and its rear side greater than groove width W18 while the curved shape having a U-shaped cross-section, with which wall surfaces 15A and 15B are smoothly continuous as previously described, is maintained from narrow width section 18 through expanding width section 20. Thus, there is no formation of a ridgeline section between these wall surfaces as in the prior art, there is no decrease in the quality of chip discharge, and there is no need to perform additional grinding to remove this ridgeline section, thereby making it possible to provide a drill in which the quality of chip discharge is even further improved while maintaining a high level of production efficiency.

Furthermore, in the production method of the present embodiment, although the drill of the present embodiment is attempted to be produced by changing the angle of deflection of grindstone 22 in this manner, the drill itself of the present invention is not limited to such a production method, but rather, can be produced by, for example, grinding so that both wall surfaces are widened by shifting the grindstone in the direction of drill rotation and its rear side at the same angle of deflection as the narrow width section in the wide width section. In addition, even if the angle of deflection of the grindstone is not changed, groove width can also be increased by, for example, widening both wall surfaces by using a grindstone in which the thickness of outer peripheral section is thicker than the narrow width section in the wide width section, or increasing the cutting amount of the grindstone on the inner periphery of the drill body. However, in these methods, since the chip discharge groove formation step comprises a plurality of steps and becomes complex, or there is increased susceptible to breakage due to reduced core thickness at the wide width section, it is preferable to use the production method of the aforementioned embodiment. On the contrary, on the rear end side of expanding width section 20, namely the rear end side of cutting edge section 13, since the quality of chip discharge is ensured by gradually increasing groove width, in contrast to that described above, the core thickness of drill body 11 preferably gradually increases moving towards the rear end side.

FIGS. 5 through 10E show another embodiment of a drill of the present invention. Furthermore, in the following description, those members having the same constitutions as in the embodiment indicated with FIGS. 1 through 4 are indicated using the same reference symbols as in FIGS. 1 through 4, and their explanation is omitted.

Figure 7:
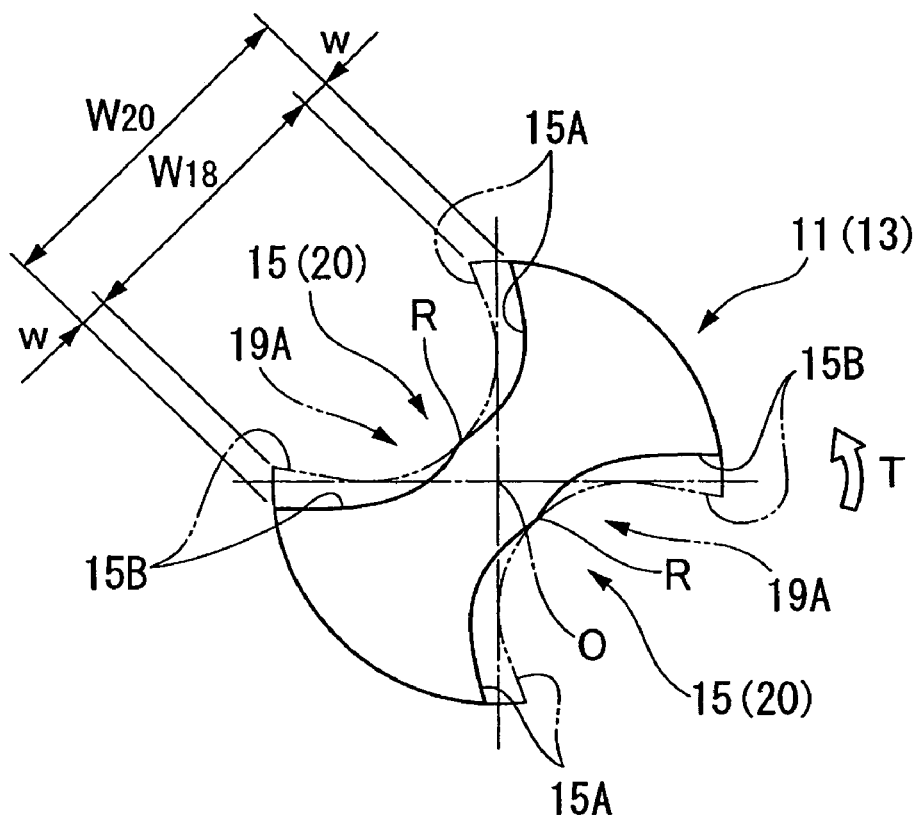
FIG. 7 is a cross-sectional view taken along Y-Y in FIG. 5.
Figure 8:
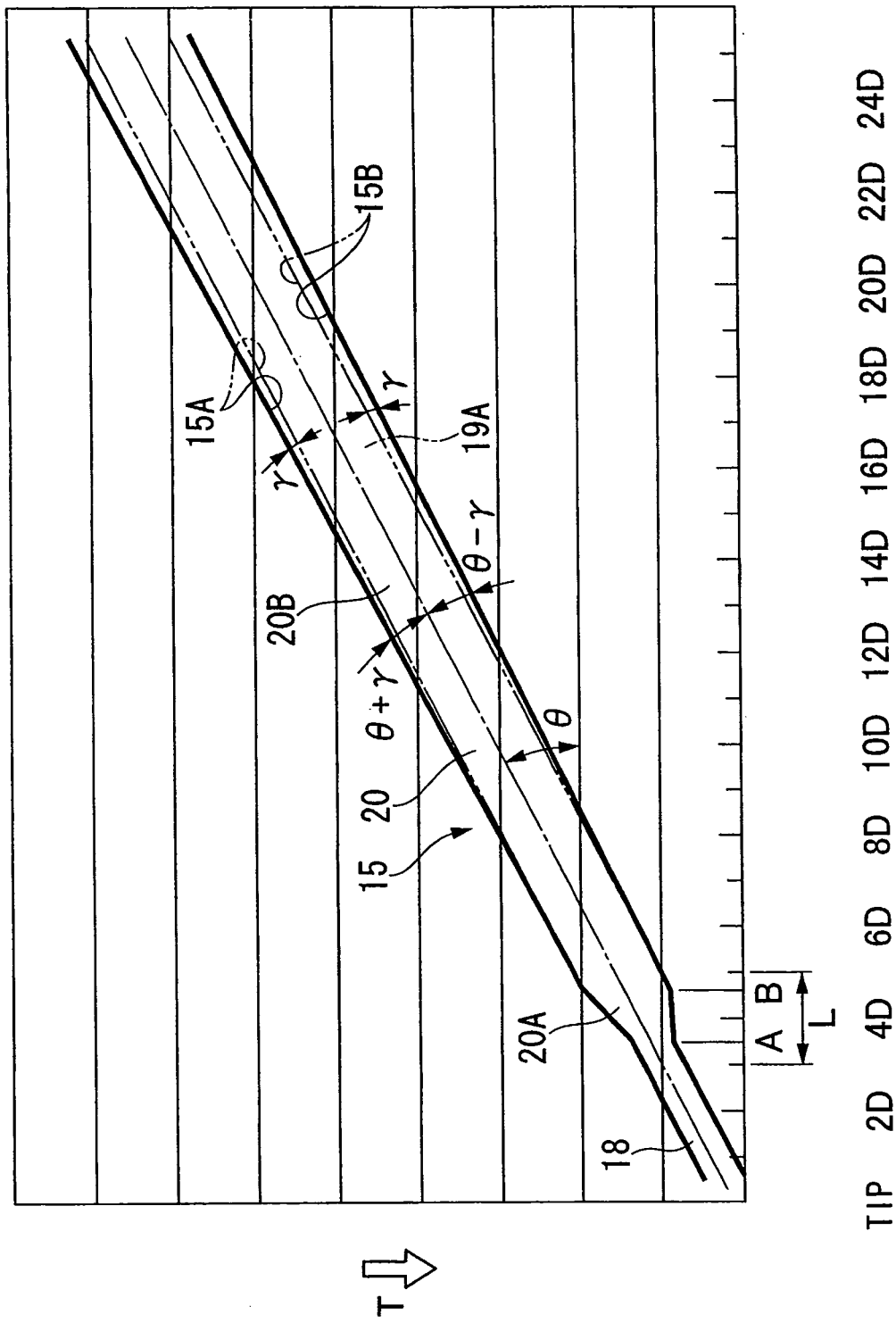
FIG. 8 is an extension drawing of a chip discharge groove of the drill shown in FIG. 5.

In the present embodiment, the portion on the tip side of a chip discharge groove 15 continuous with a cutting edge 16 is in the form of a narrow width section 18 in which helix angle $\theta$ with respect to the aforementioned axis O and groove width W are constant. In addition, an expanding width section 20 is formed in chip discharge groove 15 farther to the rear end side than narrow width section 18 in which groove width W20 is gradually widened in the direction of drill rotation T and to the rear side in the direction of drill rotation T as shown in FIG. 7 moving towards the rear end side with respect to a virtual groove 19A extended towards the rear end side from the narrow width section 18 as indicated with broken lines in FIGS. 5 and 7. In addition, FIG. 8 indicates an extension drawing when chip discharge groove 15, which is twisted in the shape of a spiral as previously described, is extended in the direction of drill rotation T about axis O. As shown in FIG. 8, expanding width section 20 is composed of a plurality of stages (two stages in the present embodiment) consisting of expanding width sections 20A and 20B in which the ratio by which groove width 20W expands towards the rear end side differs. In the present embodiment, the ratio by which first expanding width section 20A on the tip side expands is larger than the ratio by which second expanding width section 20B on the rear end side expands, although formed within a short range in the direction of axis O. Moreover, boundary A between the narrow width section 18 and expanding width section 20 (first expanding width section 20A) is located within a range L of 3-5×D with respect to outer diameter D of cutting edge 16 from the outer peripheral edge of cutting edge 16 towards the rear end side in the direction of axis O. Furthermore, reference symbol B in FIG. 8 indicates the boundary between first and second expanding width sections 20A and 20B.

In the present embodiment, the widening of groove width W20 in expanding width section 20 forms a spiral shape in which the intersecting ridgelines of wall surface 15A of chip discharge groove 15 facing in the direction of drill rotation T and wall surface 15B facing towards the rear side in the direction of drill rotation T with the outer peripheral surface of cutting edge section 13 are twisted to form a fixed angle that is increased or decreased by the angle mutually equal to the helix angles $\theta$ of the narrow width section 18 and the virtual groove 19A for each of the first and second expanding width sections 20A and 20B. Thus, the increase or decrease in the angle relative to helix angle $\theta$ of first expanding width section 20A is larger than the increase or decrease in second expanding width section 20B. In addition, as shown in FIG. 8, in a cross-sectional perpendicular to axis O, wall surfaces 15A and 15B are each widened on the rear side in the direction of drill rotation T and on the side in the direction of drill rotation T by a mutually equal width w with respect to virtual groove 19A. Furthermore, in the outer peripheral surface of cutting edge section 13, margin sections are formed either along the intersecting ridgeline with wall surface 15A facing in the direction of drill rotation T, or along both this intersecting ridgeline and the intersecting ridgeline with wall surface 15B facing towards the rear side in the direction of drill rotation T.

FIGS. 9A through 10E shown an embodiment of the production method of the present invention during production of this type of drill. FIGS. 9A and 10A are side views from the outer peripheral side in the axial direction relative to axis O of drill body 11 when a chip discharge groove 15 twisted into the shape of a spiral is virtually extended in a straight line by disrupting its spiral shape so that the center lines of groove widths W18 and W20 coincide with axis O of the drill body 11.

In the production method of the present embodiment as well, similar to the prior art as indicated in these drawings, a disk-shaped grindstone 22, on which an abrasive particle layer 21 is formed on the outer peripheral section thereof, is allowed to cut into cutting edge section 13 of the outer periphery of the tip section of drill body 11 so that the outer peripheral section follows the direction of twisting of chip discharge groove 15 (although shown to follow along axis O in FIG. 9A and FIG. 10A) while rotating around center line 22C, and by moving drill body 11 towards the direction of twisting in the direction of axis O while rotating around axis O relative to grindstone 22, both wall surfaces 15A and 15B of chip discharge groove 15 are ground by abrasive particle layer 21 resulting in the formation of chip discharge groove 15. Furthermore., although grindstone 22 is shown to be moved in FIGS. 9A and 10A, normally drill body 11 is rotated and moved while fixing grindstone 22. In addition, in the same FIGS. 9A and 10A, since chip discharge groove 15 is extended in a straight line as previously described, drill body 11 and grindstone 22 appear not to rotate relative to each other.

Moreover, in the production method of the present embodiment, when forming narrow width section 18 of the chip discharge groove 15, in contrast to drill body 11 being rotated and moved at a constant rotating speed and movement speed relative to grindstone 22 so that narrow width section 18 has a constant helix angle $\theta$ and constant groove width W, in the section serving as expanding width section 20, by respectively moving drill body 11 while rotating relative to grindstone 22 at speeds that are faster and slower than the relative rotation and movement speeds of drill body 11 relative to grindstone 22 in the section serving as narrow width section 18, groove width W20 is gradually widened in the direction of drill rotation T and on its rear side moving towards the rear end side with respect to the aforementioned virtual groove 19A.

In this case, as shown in FIG. 9A, in the section serving as narrow width section 18 from tip flank 14 of drill body 11 to the aforementioned boundary A towards the rear end side, the relative rotation and movement speed of drill body 11 and grindstone 22 is first made to be constant so that the spiral helix angle drawn by grindstone 22 in the outer periphery of drill body 11 due to its relative rotation and movement is equal to the aforementioned helix angle $\theta$. On the other hand, in the section serving as expanding width section 20 farther towards the rear end side, by making the relative rotation and movement speed greater than the constant speed of narrow width section 18 in the case of moving grindstone 22 towards the rear end side of drill body 11, a spiral groove is formed having a helix angle that is larger than helix angle $\theta$ of the virtual groove 19A in the case of leaving the relative rotation and movement speed of drill body 11 and grindstone 22 constant, and as a result, as shown in FIGS. 9B through 9E, wall surface 15A is formed that is receded farther towards the rear side in the direction of drill rotation T than wall surface 15A facing in the direction of drill rotation T of virtual groove 19A. Furthermore, at this time, if this relative rotation and movement speed is changed in a stepwise manner within a range that is larger than the aforementioned constant speed, the ratio of the expanding width of expanding width section 20 can be changed in a stepwise manner. For example, if this speed is increased on the tip side of expanding width section 20 and decreased farther towards the rear end side than the aforementioned boundary B (but still larger than the aforementioned constant speed), a wall surface 15A can be formed that has two stages of a first and second expanding width sections 20A and 20B as in the aforementioned embodiment.

Next, as shown in FIG. 10A, by making the aforementioned relative rotation and movement speed in the case of moving grindstone 22 towards the rear end side of drill body 11 in the section serving as expanding section 20 farther towards the rear and side than boundary A to be less than the constant speed in narrow width section 18, opposite the case of FIG. 9A, a spiral groove is formed in which the helix angle is smaller than helix angle θ, and as a result, as shown in FIGS. 10B through 10E, a wall surface 15B is formed that is receded farther to the side in the direction of drill rotation T than a wall surface 15B facing the rear side in the direction of drill rotation T of virtual groove 19. Furthermore, at this time, opposite from that previously described, if this relative rotation and movement speed is decreased on the tip side of expanding width section 20 and increased farther to the rear end side than boundary B (but still smaller than the aforementioned constant speed), a wall surface 15B can be formed that has two stages of first and second expanding width sections 20A and 20B as in the aforementioned embodiment.

Thus, an expanding width section 20 can be formed in which groove width 20W is gradually widened in the direction of drill rotation T and to the rear side in the direction of drill rotation T moving towards the rear end side relative to virtual groove 19A extending from narrow width section 18 by combining wall surface 15B and wall surface 15A.

The effect of a drill produced by this type of production method is similar to the drill shown in FIGS. 1 through 4. Namely, together with groove width W20 of chip discharge groove 15 in expanding width section 20 being widened in the direction of drill rotation T relative to narrow width section 18 and virtual groove 19A extending from narrow width section 18, as a result of the cross-sectional area of chip discharge groove 15 increasing due to groove width W20 being larger than groove width W18, in addition to clogging of chips naturally being prevented, chips, which are fed out to the rear side by sliding over wall surface 15A so as to be pressed against wall surface 15A on the rear side in the direction of drill rotation T accompanying rotation of drill body 11 during drilling, are able to be discharged more smoothly. As a result of this as well, clogging of chips on the rear end side of cutting edge section 13 can be reliably prevented. Namely, in contrast to chips sliding through chip discharge groove 15 while pressing against wall surface 15A, since this wall surface 15A is receded towards the rear in the direction of drill rotation T in expanding width section 20, in this expanding width section 20, the pressing force with which chips that pass through chip discharge groove 15 are pressed against the side of wall surface 15 is alleviated, thereby preventing the occurrence of a situation in which chips are compressed against each other, become entangled or become clogged due to this pressing force. As a result, the quality of chip discharge can be further improved by effectively utilizing the space within chip discharge groove 15 in which the cross-sectional surface area has been enlarged in expanding width section 20.

In addition, since groove width W20 of this expanding width section 20 is formed so as to gradually become wider moving towards the rear end side from boundary A with narrow width section 18 to prevent the groove width of chip discharge groove 15 from suddenly becoming larger from narrow width section 18, the discharge of chips that slide over wall surface 15A in particular can be further made to be smoother. In addition, since the boundary A between this expanding width section 20 and narrow width section 18 is located within the range of 3-5×D with respect to outer diameter D of cutting edge 16 from the outer peripheral edge of cutting edge 16 towards the rear end side in the direction of axis O, the occurrence of insufficient rigidity in drill body 11 caused by expanding width section 20, the length of cutting edge section 13 in particular does not cause insufficient rigidity in drill body 11 even if it forms cutting edge 16, and the occurrence of breakage can be avoided even in the case the length of cutting edge section 13 in particular is extremely long relative to outer diameter D of cutting edge 16. On the other hand, the occurrence of clogging of chips within narrow width section 18 prior to reaching expanding width section 20 due to narrow width section 18 on the tip side being excessively long can also be prevented.

Moreover, since expanding width section 20 is composed of two stages of first and second expanding width sections 20A and 20B, the ratio at which groove width 20A expands is larger for first expanding width section 20A on the tip side than second expanding width section 20B on the rear end side, and first expanding width section 20A is formed within a short range in the direction of axis O, while chips fed out from narrow width section 18 can be more smoothly led to expanding width section 20, in the case groove width W20 on the rear end side of cutting edge section 13 is excessively large and, for example, the length of cutting edge section 13 is long, a situation such as the rigidity of drill body 111 on the rear end side of cutting edge section 13 becoming insufficient as a result of its thickness being excessively ground away, or a chip discharge groove 15 overlapping between a pair of chip discharge groove 15, can be prevented. Furthermore, in order to prevent such situations more effectively, an expanding width section should be additionally formed on the rear end side of expanding width section 20 in which the groove width of chip discharge groove 15 is widened more than narrow width section 18.

In addition, in the drill production method of the present embodiment, although two steps of grinding are carried out in the same manner as the case of producing a drill of the prior art in order to form expanding width section 20 in this manner, at that time, these two steps of grinding are carried out at a relative rotation and movement speed higher and a relative rotation and movement speed lower than the constant relative rotation and movement speed of drill body 11 and grindstone 22 during formation of narrow width section 18 having a constant helix angle θ. However, since grinding of wall surfaces 15A and 15B of this type of chip discharge groove 15 is normally carried out by fixing the position of grindstone 22 that rotates about center line 22 and moving drill body 11 in the direction of axis O while rotating around axis O as previously described, even in the case of changing the relative rotation and movement speed as mentioned above, at least one of either the rotating speed around axis O or the movement speed in the direction of axis O of this drill body 11 should be regulated to be larger or smaller than the speed during grinding of narrow width section 18. Thus, a drill demonstrating the superior effects as previously described can be comparatively easily produced by controlling an ordinary drill grinding lathe.

Moreover, according to this production method, by changing the relative rotation and movement speed of drill body 11 and grindstone 22 in this narrow width section 20 to be small and large, a spiral groove having a larger helix angle and a spiral groove having a smaller helix angle than helix angle θ are formed on the side in the direction of drill rotation T and on the rear side in the direction of drill rotation T of the aforementioned virtual groove 19A as previously described, and as a result, groove width W20 is gradually widened on the side in the direction of drill rotation T and on the rear side in the direction of drill rotation T moving towards the rear end side relative to groove width W18 of narrow width section 18. Thus, a ridgeline section R as shown in FIG. 7 is formed at the section where these spiral grooves overlap in the same manner as in the prior art. However, since the mutual helix angles are larger and smaller than the aforementioned helix angle θ, as shown in FIGS. 10A through 10E, the section where these spiral grooves overlap is formed so that although small on the rear end side of expanding width section 20 and gradually becoming larger moving towards the tip side, the height of ridgeline section R is large on the rear end side of expanding width section 20 and gradually becomes smaller moving towards the tip side. Consequently, a decrease in the quality of chip discharge caused by a ridgeline section R, such as the occurrence of clogging of chips that have been discharged from narrow width section 18 to expanding width section 20 as a result of catching on ridgeline section R, can be prevented in advance. In addition, even in the case in which ridgeline section R is removed by repeating grinding after forming expanding width section 20, the grinding work is easy because only the ridgeline section R on the rear end side of expanding width section 20 need be removed.

FIGS. 11 through 17 indicate another embodiment of the drill of the present invention.

Figure 11:
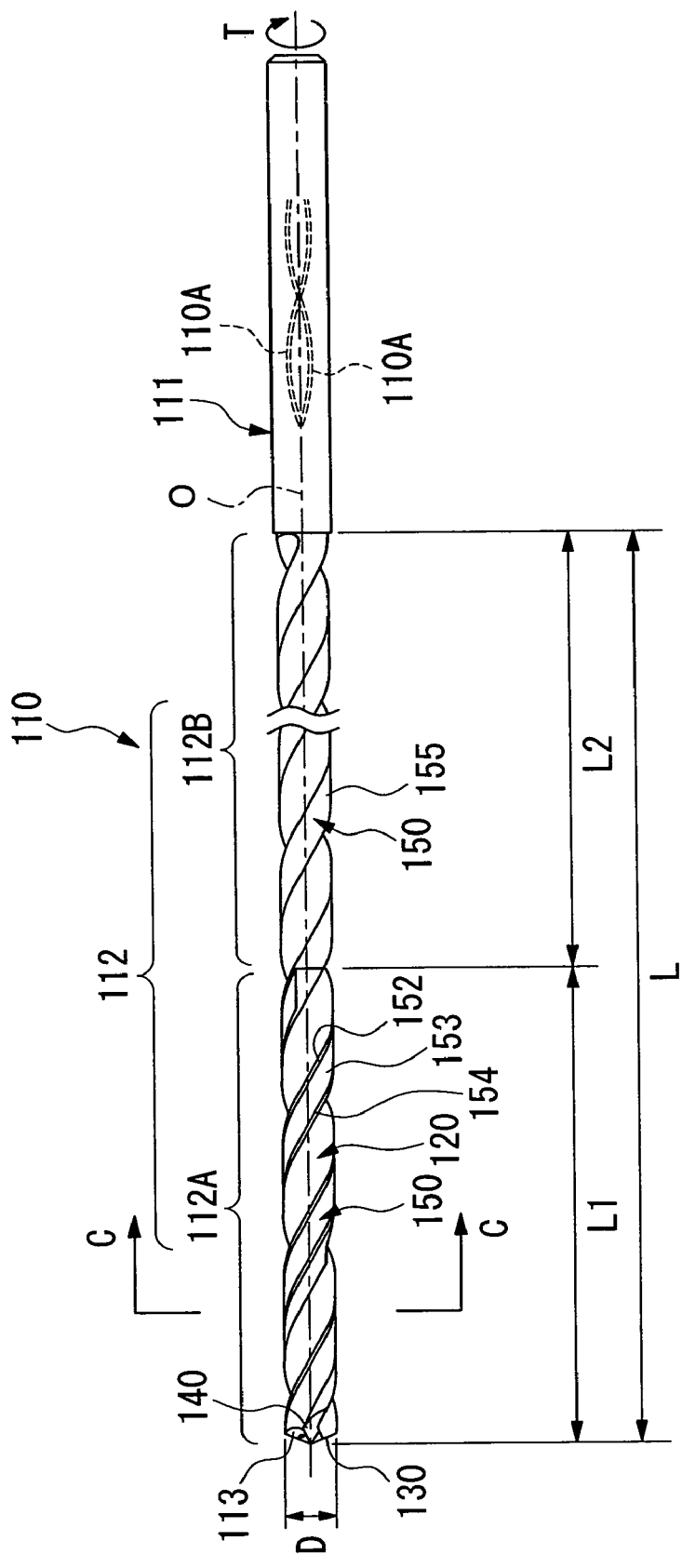
FIG. 11 is a side view of a drill showing another embodiment of the present invention.

As shown in FIG. 11, drill body 110 of the drill according to the present embodiment is formed into a roughly cylindrical shape centered about axis O from a hard material such as cemented carbide, and together with its rear end section being in the form of a shank section 111 which is clamped to a rotary shaft of a machine tool, its tip section is in the form of drilling end section 112.

Drilling end section 112 is composed of back taper section 112A, of which the outer diameter gradually decreases at a constant ratio moving towards the rear end side in the direction of axis O, and a straight section 112B, which together with being smoothly continuous from the rear end of this back taper section 112A, has an outer diameter that is roughly constant along the direction of axis O. At this time, the ratio L1:L2 between length L1 of back taper section 112A along the direction of axis O and length L2 of straight section 112B along the direction of axis O is set to, for example, 1:1 to 1:6.

A pair of chip discharge grooves 120, which are twisted in the direction of drill rotation T at a constant helix angle moving from a tip flank 113 to the rear end side in the direction of axis O, are symmetrically formed with respect to axis O in the outer periphery of drilling end section 112, and a cutting edge 130 is respectively formed on the intersecting ridgeline sections of inner wall surface 121 and tip flank 113 facing towards the front in the direction of drill rotation T of these chip discharge grooves 120.

Figure 12:
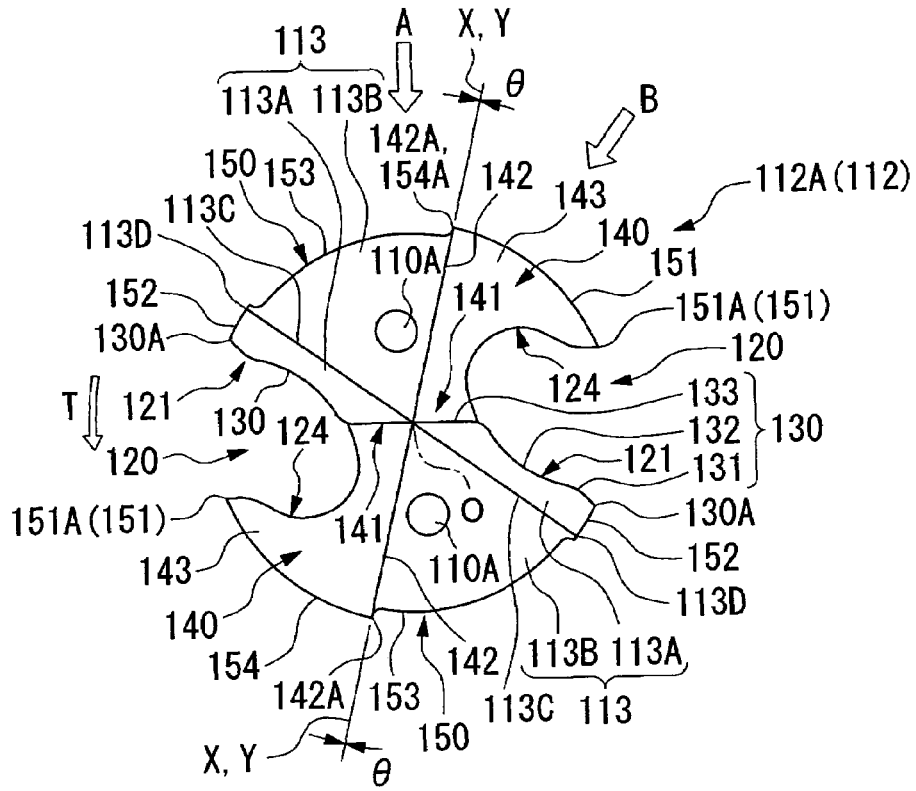
FIG. 12 is an end view of the drilling end section of the drill shown in FIG. 12.
Figure 13:
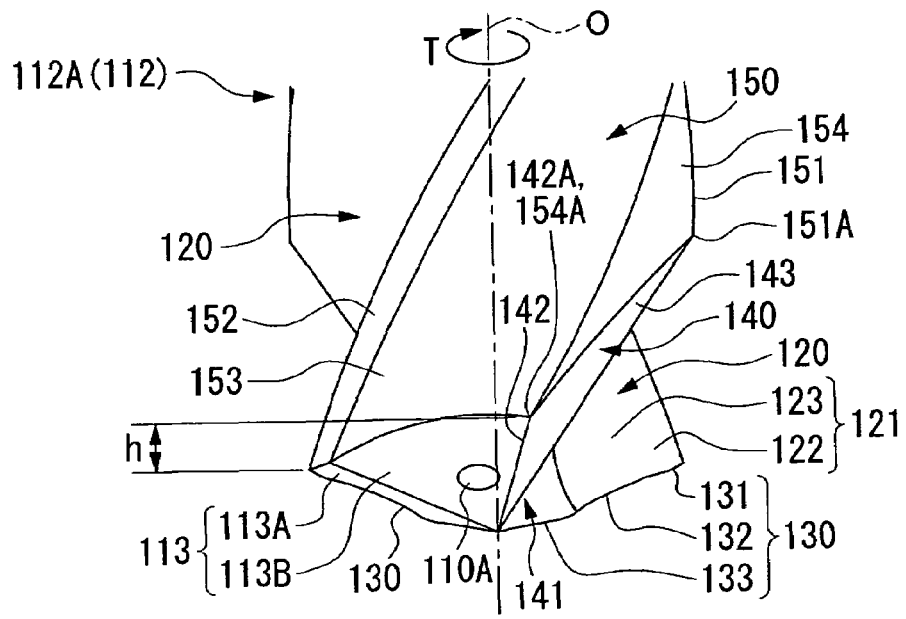
FIG. 13 is a view in the direction of arrow A in FIG. 12.
Figure 14:
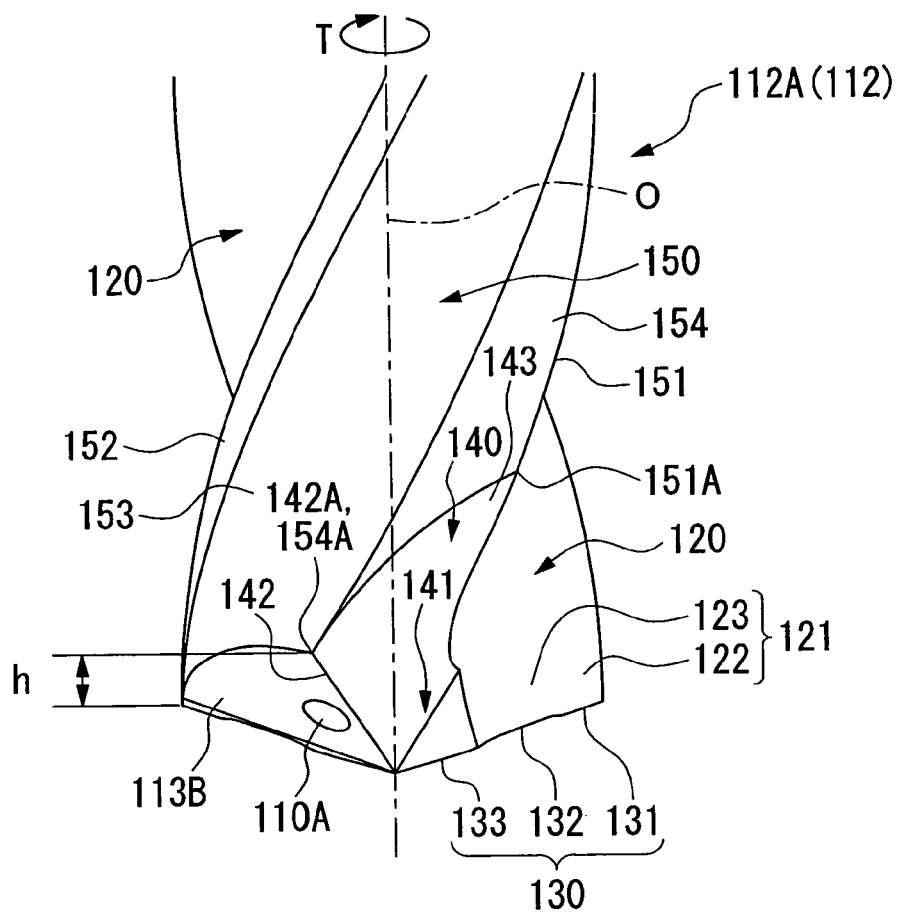
FIG. 14 is a view in the direction of arrow B in FIG. 12.

As shown in FIG. 12, tip flank 113 of drilling end section 112 is in the form of a multilevel surface composed of a first flank 113A, which is formed in a ridgeline section on the front side in the direction of drill rotation T by cutting edge 130 as a result of intersecting with chip discharge groove 120, and a second flank 130, which is continuous with the rear side in the direction of drill rotation T of first flank 113A, and a recess is imparted to cutting edge 130 so as to become larger in a stepwise manner moving towards the rear side in the direction of drill rotation T, including a thinning section 140 to be described later. In addition, this tip flank 113 is inclined towards the rear end side of drilling end section 112 moving from the inner peripheral side towards the outer peripheral side, and as a result, cutting edge 130 has a predetermined point angle.

A pair of coolant holes 110A, which extend while twisting around axis O in the same manner as chip discharge grooves 120, are formed within drill body 110 moving from shank section 111 towards the tip side in the direction of axis O, and the ends of these coolant holes 110 are respectively opened in second tip flank 113B in tip flank 113. During drilling, coolant is supplied to the drilling site from these coolant holes 110A.

Figure 15:
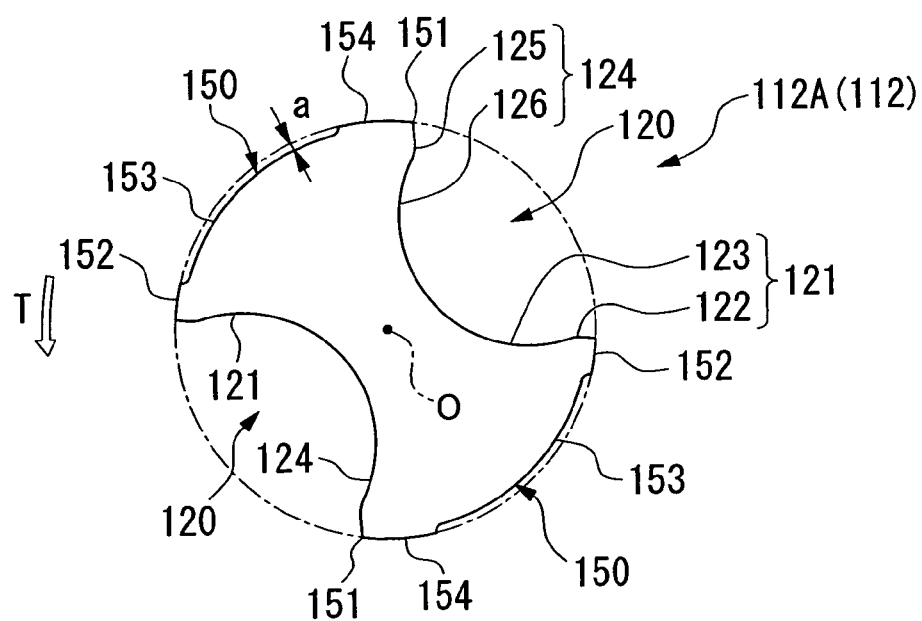
FIG. 15 is a cross-sectional view taken along C-C in FIG. 12.
Figure 16:
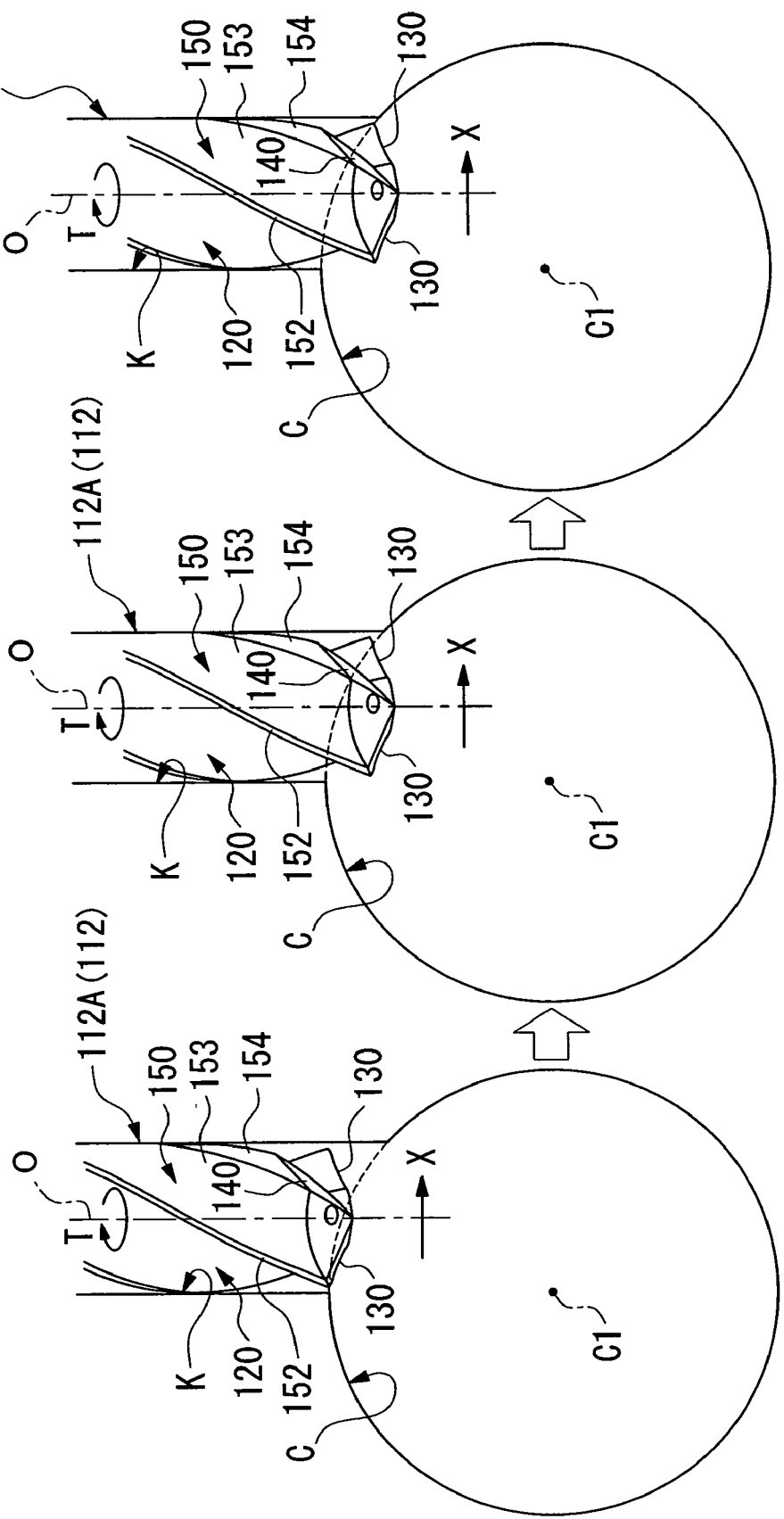
FIG. 16A is an explanatory drawing showing the state of drilling using a drill according to an embodiment of the present invention.
FIG. 16B is an explanatory drawing showing the state of drilling using a drill according to an embodiment of the present invention.
FIG. 16C is an explanatory drawing showing the state of drilling using a drill according to an embodiment of the present invention.

Inner wall surface 121, which faces the front side of chip discharge groove 120 in the direction of drill rotation T, intersects land section 150 of drilling end section 112 at its outer peripheral side, and in the cross-section that is perpendicular to axis O as shown in FIG. 15, is composed of a first convex curve section 122, which has the shape of a convex curve serving as a protrusion on the front side in the direction of drill rotation T, and a first concave curve section 123, which is located on the inner peripheral side of this first convex curve section 122 and has the shape of a concave curve recessed towards the rear side in the direction of drill rotation T in the cross-section perpendicular to the same axis O.

In addition, inner wall surface 124, which faces the rear side of chip discharge groove 120 in the direction of drill rotation T, extends to heel section 151 at its outer peripheral side (intersecting with land section 150 of drilling end section 112), and in the cross-section perpendicular to axis O, is composed of a second convex curve section 125, which has the shape of a convex curve on the rear side in the direction of drill rotation T, and a second concave curve section 126, which is located on the inner peripheral side of this second convex curve section 125 and has the shape of a concave curve recessed towards the front side in the direction of drill rotation T in the cross-section perpendicular to the same axis O.

In addition, together with chip discharge groove 120 being coupled so that the corresponding convex and concave curves formed by the cross-sections of first convex and concave curve sections 122 and 123 of inner wall surface 121 that faces its front side in the direction of drill rotation T smoothly make contact, is also coupled so that the convex and concave curves formed by the cross-sections of second convex and concave curve sections 125 and 126 of inner wall surface 124 facing towards the rear side in the direction of drill rotation T smoothly make contact, and so that the corresponding concave curves formed by the cross-sections of the first and second concave curve sections 123 and 126 of both inner wall surfaces 121 and 124 make smooth contact at the bottom section of chip discharge groove 120.

In addition, in cutting edge 130, which is formed in the intersecting ridgeline section between inner wall surface 121, facing towards the rear side of chip discharge groove 120 in the direction of drill rotation T, and tip flank 113, since this inner wall surface 121 is composed of first convex and concave curve sections 122 and 123, as shown in FIG. 12, drilling convex curve-shaped end section 131, in the shape of a curve that serves as a protrusion towards the front side in the direction of drill rotation T, is formed in its outer peripheral side, while together with being continuous with first convex curved section 122 on its rear end side, continuous concave curve-shaped drilling end section 132, which makes smooth contact with convex curve-shaped drilling end section 131 by forming a curved shape that serves as a recess towards the rear side in the direction of drill rotation T, is formed on the inner peripheral side of this convex curve-shaped drilling end section 131, and is continuous with first concave curve section 123 on its rear end side.

As a result, a gently curving S-shape is formed between these convex and concave curve-shaped drilling end sections 132 and 132 when viewed from the tip side in the direction of axis O. Furthermore, since the outer peripheral portion of cutting edge 130 serves as convex curve-shaped drilling end section 131, the rake angle in the radial direction formed by cutting edge 130 at its outer peripheral edge 130 is set to be on the negative angle side.

In addition, thinning section 140, which extends to land section 150 including heel section 151, is formed on the tip side of inner wall surfaces 121 and 124, which face towards the front side and rear side of chip discharge groove 121 in the direction of drill rotation T, so that the intersection ridgeline section that intersects with tip flank 113 (first flank 113A and second flank 113B) from the inner peripheral side of first concave curve section 123 to second concave curve section 126 and second convex curve section 125 is cut out towards the inside of chip discharge groove 120 moving towards the rear end side of drilling end section 112.

Thus, an intersecting ridgeline section is formed between this thinning section 140 and first flank 113A, and the inner peripheral edge side of cutting edge 130 is in the form of thinning cutting edge section 133 that extends from the inner peripheral edge of concave curve-shaped drilling end section 132 towards axis O located in the center of tip flank 113. Furthermore, in this cutting edge 130, the section where this thinning drilling end section 133 intersects with concave curve-shaped drilling end section 132 is smoothly connected by a curve serving a projection towards the front side in the direction of drill rotation T or a straight line when viewed from the tip side in the direction of axis O.

In addition, in thinning section 140, which extends towards the tip side while intersecting with inner wall surfaces 121 and 124 of chip discharge groove 120, the section that extends to as to reach land section 150 (including heel section 151) by intersecting with inner wall surface 124 facing towards the rear side of chip discharge groove 120 in the direction of drill rotation T is in the form of flat surface section 124 that formed in the shape of flat surface so as to be inclined towards the rear end side in the direction of axis O moving towards the rear side in the direction of drill rotation T.

On the other hand, in this thinning section 140, the section where inner wall surfaces 121 and 124, which face towards the front side and rear side of chip discharge groove 120 in the direction of drill rotation T, intersect, namely the section that extends from the bottom of chip discharge groove 120 (section where first and second concave curve sections 123 and 126 intersect) towards axis O located in the center of tip flank 113, in is the shape of a concave curve, the bottom section 141 of that curve is inclined so as to recede to the inner peripheral side of drilling end section 122 relative to both inner wall surfaces 121 and 124, while being formed so as to extend to the tip side towards the inner peripheral edge of cutting edge 130, namely the inner peripheral edge of thinning drilling end section 133.

Here, as shown in FIG. 15 when viewed in the cross-section that intersects with axis O, the outer peripheral surface of back taper section 112A of drilling end section 112, excluding the pair of chip discharge grooves 120, namely land section 150 in back taper section 112A, is composed of a first margin section 152, which intersects with the outer peripheral ridgeline section of first convex curve section 122 in inner wall surface 121 facing towards the rear side of chip discharge groove 120 in the direction of drill rotation T and having a roughly arc shape centered about axis O, and a body clearance 153 continuous with the rear side of this first margin section 152 in the direction of drill rotation T and having a roughly arc shape centered about axis O that has an outer diameter one step smaller than the arc formed by first margin section 152, and a second margin section 154 continuous with the rear side of this body clearance 153 in the direction of drill rotation T, which intersects with the outer peripheral ridgeline section (heel section 151) of second convex curve section 125 in inner wall surface 124 facing towards the rear side of chip discharge groove 20 in the direction of drill rotation T, and having a roughly arc shape centered about axis O that has an outer diameter equal to the arc formed by first margin section 152.

In addition, these first and second margin sections 152 and 154 along the body clearance 153 are formed along roughly the entire length of back taper 112A in the direction of axis O so as to be twisted towards the rear side in the direction of drill rotation moving from the section that intersects with tip flank 113 towards the rear end side in the direction of axis O in the same manner as chip discharge groove 120.

Moreover, among the first and second margin sections 152 and 154 along with body clearance 153, in body clearance 153, which is continuous with first margin section 152, which is adjacent to the rear side of chip discharge groove 120 in the direction of drill rotation T, also towards the rear side in the direction of drill rotation T, in contrast to the width along the circumferential direction about axis O being maintained roughly constant over roughly the entire length of back taper section 112A, in second margin section 154, which is adjacent to the front side of chip discharge groove 20 in the direction of drill rotation T, the width along the circumferential direction increases at an intermediate section moving from the rear end of back taper section 112A towards the tip side in the direction of axis O.

Second margin section 154, which extends while increasing the width along the circumferential direction moving towards the tip side in the direction of axis O, intersects with flat surface section 143 that extends to land section 150 containing heel section 151 in thinning section 140 in its tip section in the direction of axis O.

In this case, when back taper section 112A is viewed from the tip side in the direction of axis O, as shown in FIG. 12, since the width along the circumferential direction is maintained roughly constant along the direction of axis O in first margin section 152, in contrast to being formed in the very small section reaching to outer peripheral edge 113D of intersecting ridgeline section 113C between first flank 113A and second flank 113B from outer peripheral edge 130A of cutting edge 130 towards the rear side in the direction of drill rotation T, second margin section 154 is formed in a comparatively wide section reaching to the vicinity of outer peripheral edge 142A of the intersecting ridgeline section 142 between second flank 113B and thinning section 140 from the heel section 151 intersected by thinning section 140 (tip 151A in heel section 151 in the direction of axis O) towards the front side in the direction of drill rotation T.

More specifically, when viewed from the tip side in the direction of axis O, the intersecting angle θ formed by a straight line X that connects a point 154A, which is located farthest towards the front side in the direction of axis O in second margin section 154, and axis O, and a straight line Y that connects the outer peripheral edge 42A of intersecting ridgeline 42 between second flank 113B (tip flank 113) and shinning section 140, and axis O, is set within the range of −5° to 10° when the aforementioned straight line X is assigned a positive value when located closer to the front side in the direction of drill rotation T than the aforementioned straight line Y.

Furthermore, in the present embodiment, when viewed from the tip side in the direction of axis O, point 154A located farthest towards the front side in the direction of drill rotation T in second margin section 154 roughly coincides with outer peripheral edge 142A of intersection ridgeline section 142 between second flank 113B and thinning section 140, and thus, the intersecting angle θ formed by the aforementioned straight lines X and Y is set to 0°.

Here, since the flat surface section 143 of thinning section 140 that is intersected by second margin section 154 at the tip section in the direction of axis O is inclined to the rear end side in the direction of axis O moving towards the rear side in the direction of drill rotation T, at the tip section of this second margin section 154, the section on the rear side in the direction of drill rotation T is cut out in an inclined direction that intersects the direction of width by flat surface section 143 of thinning section 140.

Thus, in an area where second margin section 154, which has been extended while increasing the width also along the circumferential direction towards the tip side in the direction of axis O, extends into a section that intersects with flat surface section 143 of thinning section 140, namely an area farther to the tip side in the direction of axis O than tip 151A in the direction of axis O in heel section 151, the width along the circumferential direction gradually becomes smaller moving towards the tip side in the direction of axis O while reaching a point located farthest to the tip side in the direction of axis O in second margin section 154.

Since this point located farthest to the tip side in the direction of axis O in second margin section 154 coincides with point 154A located farthest to the front side in the direction of drill rotation T in second margin section 154 when viewed from the tip side in the direction of axis O, in the vicinity of this point 154A, the width along the circumferential direction in second margin section 154 becomes about 0.

Furthermore, in the present embodiment, when viewed from the tip side in the direction of axis O, since point 154A located farthest to the front side in the direction of drill rotation T in second margin section 154 roughly coincides with the outer peripheral edge 142A of intersection ridgeline section 142 between second flank 113B and thinning section 140, the width along the circumferential direction of second margin section 154 becomes 0 at this point 154A.

In addition, the outer diameter of back taper section 112A gradually decreases at a constant ratio moving towards the rear end side in the direction of axis O (for example, at a ratio of 0.35/100 to 0.40/100), namely the outer diameter of a virtual circle, which has for its arc a cross-section perpendicular to axis O of first and second margin sections 152 and 154 that compose land section 150, gradually decreases at a constant ratio moving towards the rear end side in the direction of axis O. Accompanying this, the outer diameter of a virtual circle having a cross-section perpendicular to axis O for its arc of a body clearance 153 located between corresponding first and second margin sections 152 and 154 in back taper section 112A also gradually decreases at a constant ratio moving towards the rear end side in the direction of axis O of back taper section 112A. Consequently, body clearance depth a of body clearance 153 is set to a constant value (e.g., 0.05 mm to 0.10 mm) over roughly the entire length of back taper section 112A.

The land section 150 of straight section 112B continuous with the rear end side of this back taper section 112, when viewed in a cross-section perpendicular to axis O although not shown in the drawings, is in the form of margin section 155 having a roughly arc shape centered about axis O, which extends from a section that intersects the outer peripheral ridgeline section of first convex curve section 122 in inner wall surface 121 of chip discharge groove 120 facing to the front side in the direction of drill rotation T, to the section that intersects the outer peripheral ridgeline section (heel section 151) of second convex curve section 125 in inner wall surface 124 of chip discharge groove 120 facing to the rear side in the direction of drill rotation T. In addition, this margin section 155 is formed over roughly the entire length of straight section 112B in the direction of axis O so as to be twisted towards the rear side in the direction of drill rotation T moving from straight section 122B connected to the rear end of back taper section 112B towards the rear end side in the direction of axis O in the same manner as chip discharge groove 120.

Here, the outer diameter of straight section 112B, namely the outer diameter of the arc formed by the cross-section of margin section 155 that composes land section 150, is set to be slightly smaller than the outer diameter of the arc formed by the cross-section of body clearance 153 that composes land section 150 of back taper section 112A. Thus, the tip of straight section 112B is continuous with the rear end of back taper section 112 through a slight level difference. Namely, in drilling end section 112, margin section 155 that composes land section 150 of straight section 112B is continuous with first and second margin sections 152 and 154 as well as body clearance 153 in land section 150 of back taper section 112A through a slight level difference at the tip of straight section 112B (rear end of back taper section 112A).

In addition, in the present embodiment, the surface of drilling end section 112 in drill body 110, namely the surfaces of land section 150 serving as the outer peripheral surface of drilling end section 112, tip flank 113, inner wall surfaces 121 and 124 of chip discharge grooves 120 and the surface of thinning section 140 and so forth are covered with a hard coating such as TiN, TiCN or TiAlN.

The entire surface of drilling end section 112 covered by a hard coating is polished by applying a paste containing diamond particles or other hard particles to a brush, and as a result, the surface roughness Ra (calculated mean roughness as defined in JIS B 0601-1994) is set to within the range of Ra=0.1 μm to 0.3 μm (while Ra=0.5 μm to 1.0 μm in the state prior to performing polishing).

Furthermore, in the case of expressing with surface roughness Rz (10 point average roughness as defined in JIS B 0601-2001) instead of surface roughness Ra, the surface roughness Rz after polishing is set to the range of Rz=0.4 μm to 1.2 μm (and to Rz=2.0 μm to 4.0 μm in the state prior to performing polishing).

In a drill according to the present embodiment composed in the manner described above, when viewed from the tip end in the direction of axis O, second margin section 154 formed in land section 150 of back taper section 112 of its drilling end section 112 is formed over a large range from heel section 151 towards the front side in the direction of drill rotation T as a result of positioning a point located farthest to the front side in the direction of drill rotation T in the vicinity of outer peripheral edge 142A of intersecting ridgeline section 142 between second flank 113B and thinning section 140.

Consequently, the tip of second margin section 154 in the direction of axis O (point 154A) is also located in the vicinity of outer peripheral edge 142A of intersecting ridgeline section 142 between second flank 113B and thinning section 140. Accompanying this, a distance h along the direction of axis O between the tip of first margin section 152 in the direction of axis O and the tip of second margin section 154 in the direction of axis O is much smaller that the case of a double margin type drill of the prior art. (For example, the aforementioned distance h is set within the range of 0.07D to 0.20D with respect to the maximum outer diameter D of drilling end section 112 (outer diameter at the tip of drilling end section 112).

Thus, as shown, for example, in FIGS. 16A through 16C, even in the case of drilling into a cross hole C formed in advance in a drill material so that a machined hole K to be formed passes through on an incline towards a location shifted from center C1 of cross hole C, when drilling end section 112 passes through to the inner wall surface of cross hole C, both of the first and second margin sections 152 and 154 immediately make contact with the inner surface walls of an exit section that composes an opening section to the inner wall surface of cross hole C in machined hole K, and as a result, drilling end section 112 is able to guided with stability by these first and second margin sections 152 and 154.

Thus, when drilling end section 112 passes through to the inner wall surface of cross hole C, even if force is applied in the horizontal direction (direction X in the drawings) that intersects the tip section of drilling end section 112 in the direction of axis O, due to the guiding action of first and second margin sections 152 and 154, drilling end section 112 can be made to be less susceptible to deflection. Accordingly, together with being able to satisfactorily maintain the inner wall surface roughness of the formed machined hole K, the potential for loss resulting from drilling edge 130 contacting other wall surfaces and loss of drilling end section 112 can be decreased.

Here, if point 154A, which is located farthest to the front side in the direction of drill rotation T in second margin 154 when viewed from the tip side in the direction of axis O, is located such that the aforementioned intersecting angle θ is smaller than −5°, there is the possibility of it being no longer possible to set distance h along the direction of axis O between the tip of first margin section 154 and the tip of second margin section 154 (point 154A). On the other hand, if the aforementioned point 154A is located such that the aforementioned intersecting angle θ is greater than 10°, there is the possibility of inviting an increase in drilling resistance occurring during drilling.

In addition, in the drill according to the present embodiment, since drilling end section 112 is composed of back taper section 112A, which composes its tip side section, and straight section 112B, which composes the rear end side section, with respect to back taper section 112A in particular, by imparting a recess in first and second margin sections 152 and 154 formed in land section 150 so as to become larger moving towards the rear end side in the direction of axis O, and allowing only the tip side sections in the direction of axis O in these first and second margin sections 152 and 154 to make contact with the inner wall surface of machined hole K, the increase in drilling resistance during drilling can be suppressed.

Moreover, since drilling end section 112, which is located farther to the rear end side in the direction of axis O than the rear end of back taper section 112A (at which the outer diameter is the smallest and which is imparted with an adequate recess), namely straight section 112B smoothly connected to the rear end of back taper section 112A, maintains the outer diameter that is roughly identical to the outer diameter at the rear end of back taper section 112A to be roughly constant along the direction of axis O, the rigidity of drilling end section 112 is not decreased beyond that which is necessary.

In this manner, if drilling end section 112 is composed of back taper section 112A and straight section 112B, remarkable effects can be demonstrated in a deep hole drill that is particularly susceptible to a decrease in rigidity when a back taper is provided over roughly the entire length of drilling end section 112, namely a drill in which length L of drilling end section 112 in the direction of axis O is set to be long. Furthermore, as shown, for example, in FIG. 11, a drill for drilling deep holes refers to the case in which the ratio L/D between length L of drilling end section 112 in the direction of axis O (=L1+L2) and maximum outer diameter D of drilling end section 112 (outer diameter at the tip of drilling end section 112) is set to a range of 5 to 30.

In addition, in the drill according to the present embodiment, after a hard coating is applied to the surface of drilling end section 112, since polishing is performed at least on the surfaces of first and second margin sections 152 and 154 (over the entire surface of drilling end section 112 in the present embodiment) to set the surface roughness to a low level (Ra=0.1 μm to 0.3 μm), roughening of the inner surface wall of the formed machined hole K due to contact between the inner surface wall of machined hole K and these first and second margin sections 152 and 154 can be prevented. In other words, by covering the surface of drilling end section 112 with a hard coating to improve wear resistance while polishing first and second margin sections 152 and 154, in which surface roughness tends to become comparatively large due to this hard coating, roughening of the inner wall surface of machined hole K accompanying contact with first and second margin sections 152 and 154 is prevented. As a result, even during the initial stage of drilling when the phenomenon in which the surface roughness of first and second margin sections 152 and 154 becomes small due to friction with the inner wall surface of machined hole K does not occur, the inner wall surface roughness of machined hole K is favorably maintained, thereby allowing the formation of a high-quality machined hole.

Moreover, in the present embodiment, since polishing is performed on the entire surface of drilling end section 112 that has been covered with a hard coating, polishing is also performed on inner wall surfaces 121 and 124 of chip discharge groove 120 so that their surface roughness Ra is set to a small value of 0.1 μm to 0.3 μm. Consequently, when chips generated by cutting edge 130 are guided to the rear end side of drilling end section 120 by chip discharge groove 120, the frictional resistance when the chips make contact with the inner wall surfaces 121 and 124 of chip discharge groove 120 can be reduced. As a result, smooth discharge of chips is promoted and the occurrence of clogging of the chips can be suppressed, thereby preventing breakage of drilling end section 120 due to clogging of chips.

Here, if the surface roughness Ra of first and second margin sections 152 and 154 following polishing is set to be smaller than 0.1 µm, there is the possibility of requiring considerable labor and time for polishing, and conversely, if it is set to be larger than 0.3 µm, there is the possibility of it being no longer possible to satisfactorily maintain the inner wall surface roughness of the machined hole K that is formed.

Figure 17:
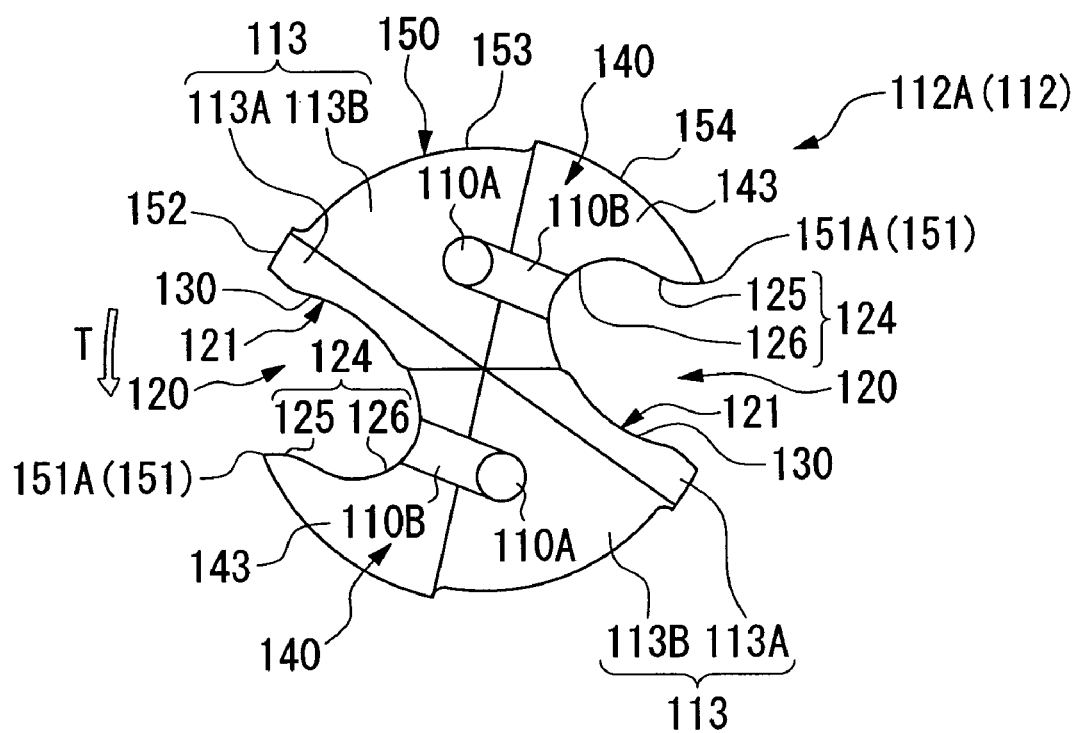
FIG. 17 is an end view showing a variation of the drilling end section of a drill according to an embodiment of the present invention.

Furthermore, in the present embodiment as explained above, although the opening section to second flank 113B of coolant hole 110A is simply in the form of a round hole, for example, as shown in FIG. 17, a cutout surface 110B having a cross-section in the shape of U-shaped groove may be formed by cutting out a flat section 143 of second flank 113B and thinning section 140 towards the rear side in the direction of drill rotation T from the opening section in the shape of a round hole of coolant hole 110A until intersecting with second concave curve section 126 in inner wall surface 124 facing to the rear side in the direction of drill rotation T of chip discharge groove 120. In this case, coolant supplied from coolant hole 110A can be efficiently introduced into chip discharge groove 120.

EXAMPLE

Figure 18:
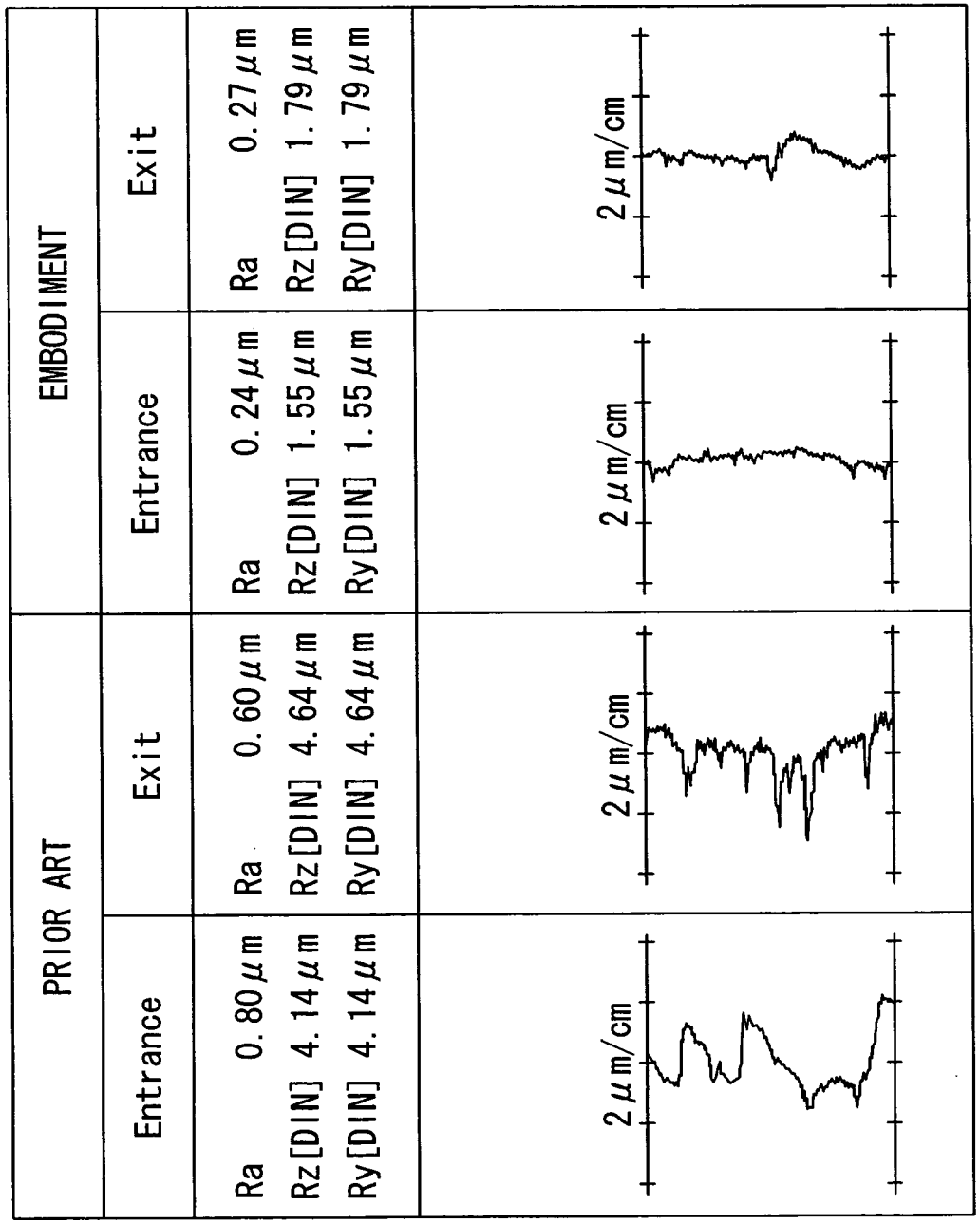
FIG. 18 is a drawing showing the data of a drilling test using a drill according to one example of the present invention and a drill of the prior art.

A drilling test was conducted using a double margin type drill based on the embodiment shown in FIGS. 11 through 17 as an example of the present invention and a double margin type drill of the prior art as an example of the prior art for the purpose of explaining the effects of the drill shown in FIGS. 11 through 17. Those results are shown in FIG. 18.

In the example of the present invention, in contrast to the inner wall surface roughness of the entrance section and exit section of a machined hole being satisfactorily maintained at a low level, in the example of the prior art, the inner wall surface roughness of the entrance and exit sections of a machined hole were found to become worse.

Figure 19:
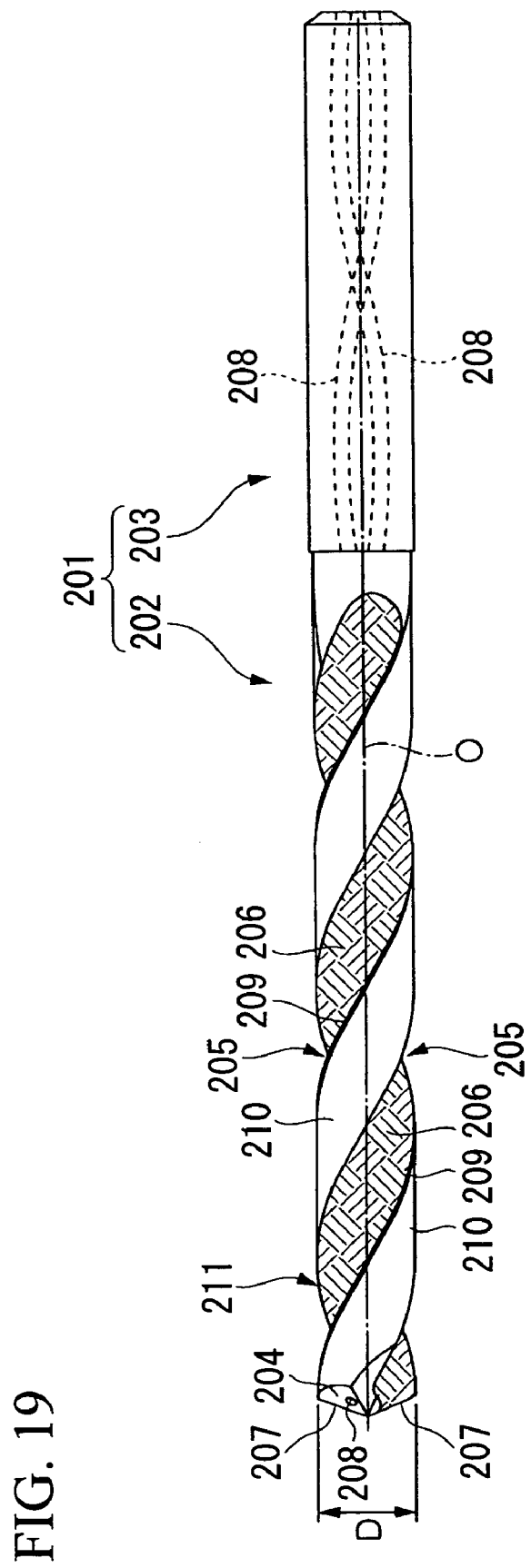
FIG. 19 is a side view of a drill showing still another embodiment of the present invention.
Figure 20:
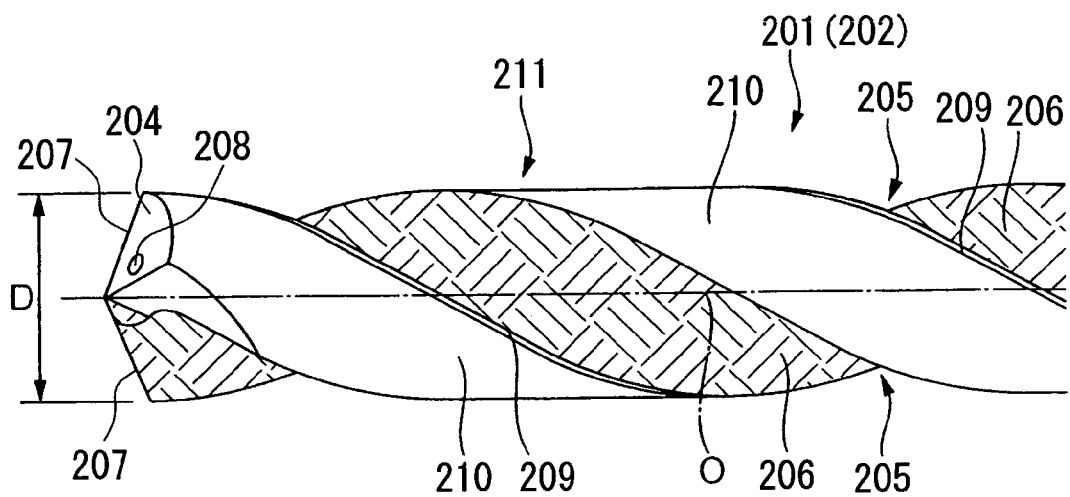
FIG. 20 is an enlarged side view of the tip side of the drilling end of the drill shown in FIG. 19.
Figure 21:
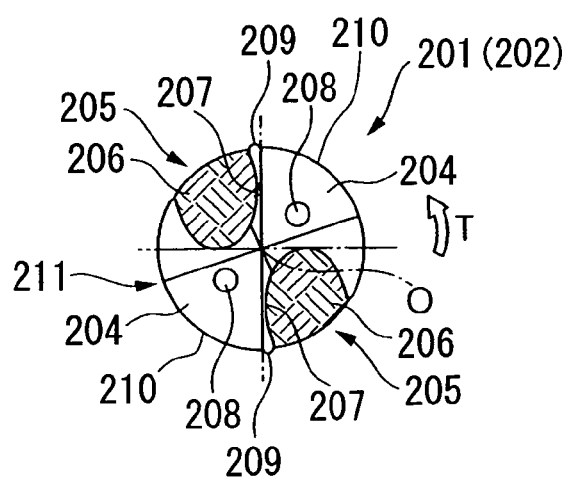
FIG. 21 is an enlarged frontal view as viewed from the tip side of the drill shown in FIG. 19.
Figure 22:
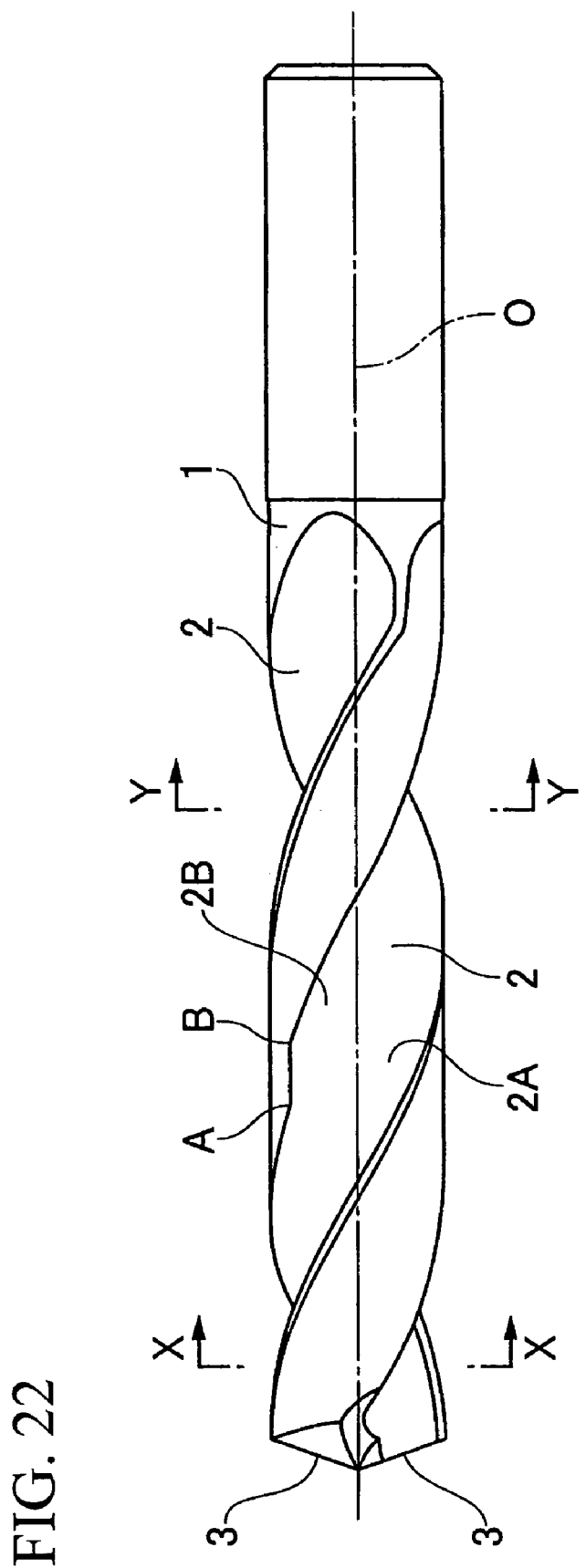
FIG. 22 is a side view of a drill of the prior art.
Figure 23:
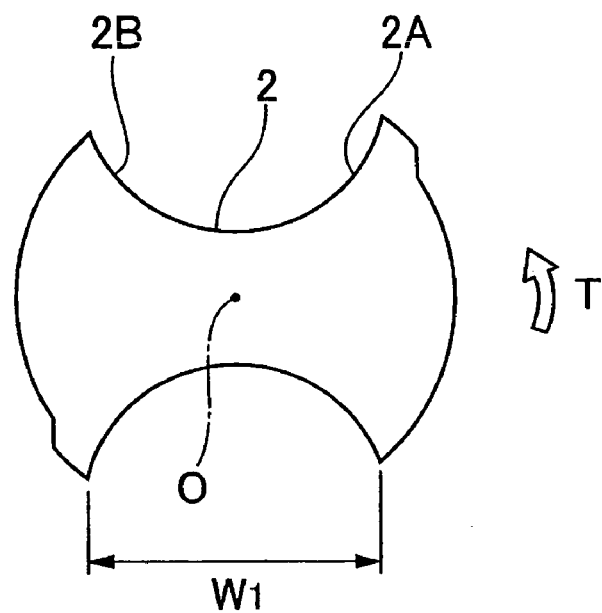
FIG. 23 is a cross-sectional view taken along X-X in FIG. 22.
Figure 24:
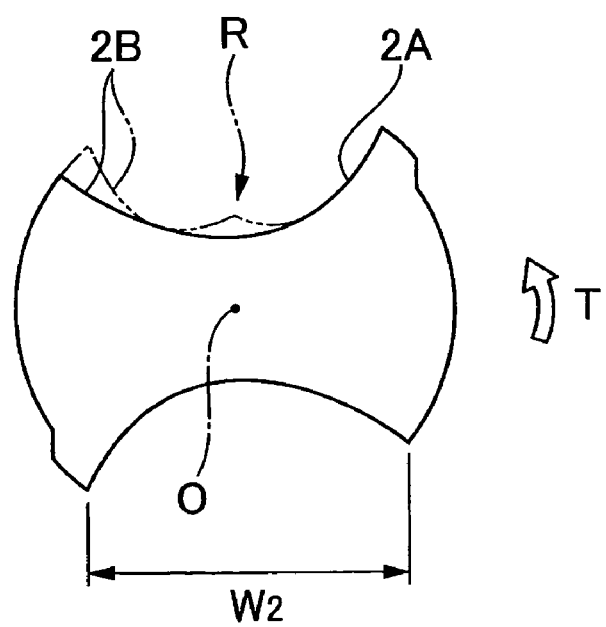
FIG. 24 is a cross-sectional view taken along Y-Y in FIG. 22.
Figure 25:
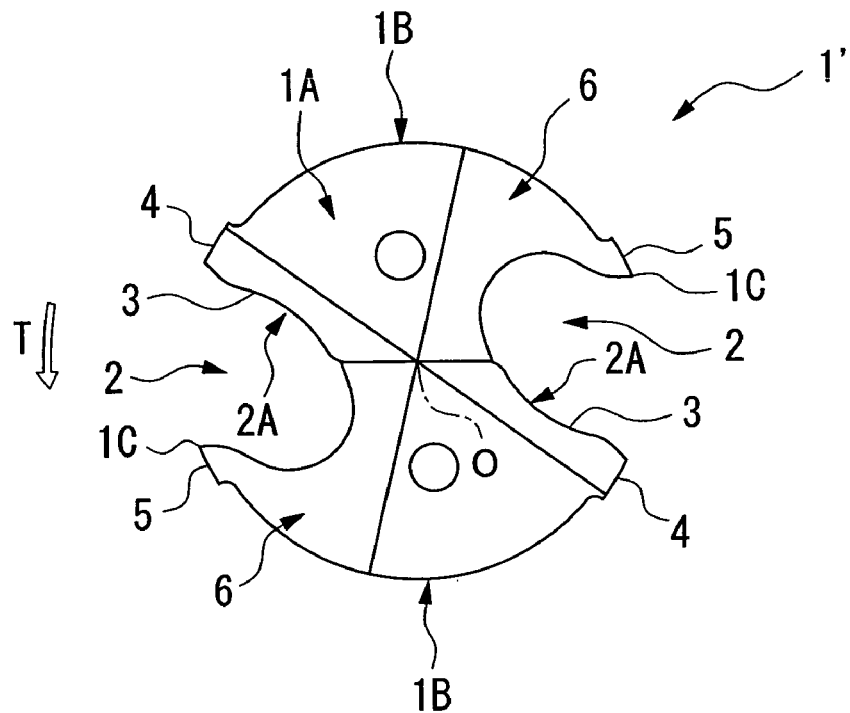
FIG. 25 is an end view showing the drilling end section of a drill of the prior art.
Figure 26:
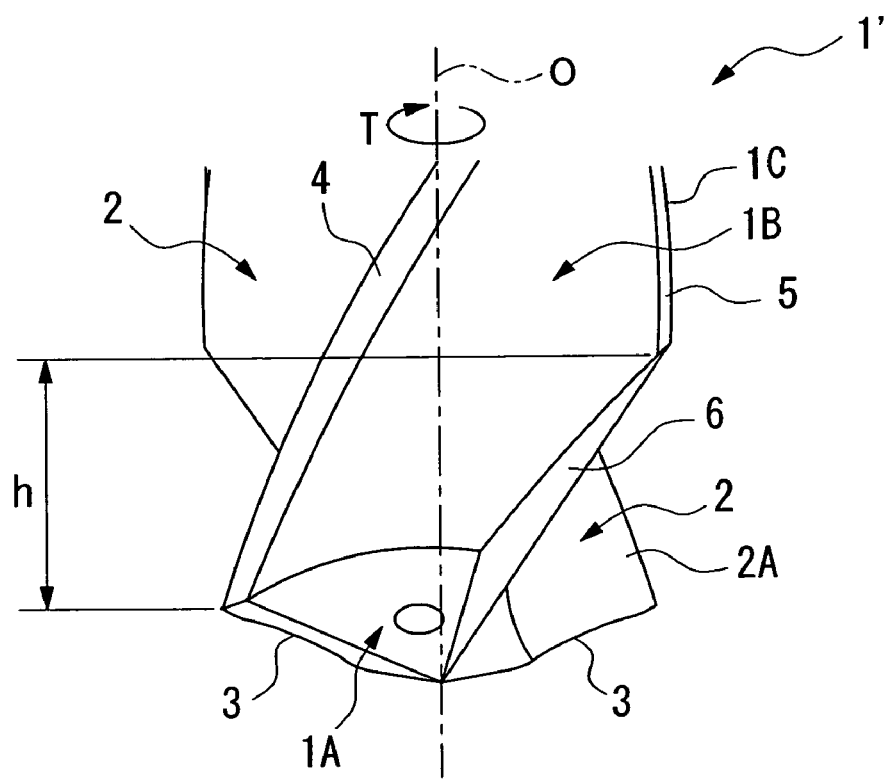
FIG. 26 is a side view showing the drilling end section of a drill of the prior art.

FIGS. 19 through 21 show still another embodiment of the drill of the present invention.

In the drill of the present embodiment, drill body 201 is composed of a member formed by a hard material such as cemented carbide and is roughly in the shape of a cylindrical column centering around axis O, and together with the tip side (left side in FIGS. 19 and 20) being in the form of a cutting edge section 202, the rear end side (right side in FIG. 19) is in the form of a shank section 203. In addition, a pair of chip discharge grooves 205, which are twisted in the shape of a spiral towards the rear side in the direction of drill rotation T moving towards the rear in the direction of axis O from tip flank 204 on the tip of drill body 201 to immediately before shank section 203 towards the rear end side, are formed so as to be mutually symmetrical with respect to axis O in the outer periphery of cutting edge section 202, and the section of inner wall surface 206 of chip discharge groove 205 that faces the side of the tip in the direction of drill rotation T is in the form of a rake face, and a cutting edge 207 is formed in the intersecting ridgeline section between this rake face and the aforementioned tip flank 204.

Furthermore, the length of this cutting edge section 202 in the direction of axis O in the present embodiment is 10×D or more, or depending on the particular case, 20×D or more or 30×D or more, with respect to the outer diameter of a circle formed by the outer peripheral edge of cutting edge 207 around axis O, namely outer diameter D of cutting edge 207. Moreover, a pair of cutting oil supply passages 208 are formed in a spiral shape so as to avoid chip discharge grooves 205 in drill body 201 from its rear end towards the tip side, and its tip opens into tip flank 204.

In addition, a margin section 209 is formed in the outer peripheral surface of cutting edge section 202 at the intersecting ridgeline section with chip discharge groove 205 on the side in the direction of drill rotation T. The outer peripheral surface of this margin section 209 has an arc-shaped cross-section having an outer diameter equal to outer diameter D of cutting edge 207, and is provided extending so as to follow chip discharge groove 205 over the entire length of cutting edge section 202 while having a small constant width in the circumferential direction. Moreover, an outer peripheral flank 210 having an arc-shaped cross-section is formed in the rear side of this margin section 209 in the direction of drill rotation T so as to recede to the inner peripheral side of drill body 201 relative to the outer peripheral surface of margin section 209. Furthermore, one pair each of margin section 209 and outer peripheral flank 210 of cutting edge 206 is formed symmetrically with respect to axis O in the same manner as chip discharge grooves 205. In addition, a back taper may be imparted to margin section 209 and outer peripheral flank 210.

Moreover, hard coating 211 is applied over the entire length of cutting edge section 202 on the surface of this cutting edge section 202. Examples of this hard coating 211 include one type or a plurality of types of TiC, TiN, TiCN or TiAlN, and the surface roughness is 2-4 µm when applied. Polishing is performed on inner peripheral surface 206 of the aforementioned chip discharge groove 205 of the surface of cutting edge section 202 on which hard coating 211 is applied as indicated by the hatched lines in FIGS. 19 through 21 by polishing inner peripheral surface 206 by applying a paste containing, for example, diamond particles with a brush. As a result, the surface roughness of inner peripheral surface 206 is smaller than the surface roughness of the outer peripheral surface of the aforementioned tip flank 204 and margin section 209 covered with hard coating 211, or the surface roughness of hard coating 211 on outer peripheral flank 210, or in other words, is smoother.

Moreover, in the present embodiment, the surface roughness of inner peripheral surface 206 of chip discharge groove 205, as measured along the direction in which chip discharge groove 205 twisted into the shape of a spiral extends, namely the direction along this spiral, is smaller than the surface roughness as measured in the circumferential direction of this inner peripheral surface 206, namely the direction perpendicular to the aforementioned spiral, or in other words, is smoother. In the case of the present embodiment, the surface roughness of inner peripheral surface 206 of chip discharge groove 205 polished in this manner is within the range of 0.5-1.5 µm in the direction in which chip discharge groove 205 extends, and within the range of 1.0-2.0 µm in the circumferential direction of inner peripheral surface 206. Furthermore, in order to make the surface roughness in the direction in which chip discharge groove 205 extends smaller than that in the circumferential direction of inner peripheral surface 206, the aforementioned brush during polishing should be, for example, made to polish inner peripheral surface 206 by moving primarily along chip discharge groove 205.

In a drill composed in this manner, since chips generated by cutting edge 207 are discharged while making sliding contact with inner peripheral surface 206 of chip discharge grooves 205 that have been polished in the manner described above, there is little frictional resistance during discharge. Thus, chips are able to be smoothly discharged from a machined hole without becoming clogged. Consequently, even in the case of drilling a deep hole, there is no occurrence of breakage of drill body 201 due to clogging of chips, and drilling can be performed reliably and with greater stability. In addition, since the resistance during discharge of chips is low in this manner, the rotational driving force of drill body 201 during drilling can be decreased, thereby promoting even more stable drilling of deep holes. Moreover, even though it has been polished, since inner peripheral surface 206 of chip discharge groove 205 is covered by hard coating 211 as previously described, the degree of wear caused by sliding contact of the chips is low. In addition, since hard coating 211 remains applied to the surface of cutting edge section 202 other than inner peripheral surface 206 of chip discharge groove 205 that has been polished, a drill can be provided that has a high level of wear resistance.

Moreover, in the present embodiment, together with the surface roughness of inner peripheral surface 206 of chip discharge groove 205 that has been polished being within the range of 0.5-1.5 µm in the direction in which the chip discharge grooves extend in the shape of a spiral, surface roughness in the circumferential direction of inner peripheral surface 206 is within the range of 1.0-2.0 µm, and as a result, the former is smoother than the latter. Thus, chips flow out so as to be guided in the direction in which chip discharge grooves 205 extend rather than the circumferential direction of inner peripheral surface 206 even within the polished chip discharge grooves 205. Consequently, according to the drill of the present embodiment, not only in the case in which curled chips are generated depending on the machined material, but also in the case in which narrow, chip-like chips are generated, chips can be reliably discharged without accumulating within chip discharge grooves 205 or within the machined hole. Furthermore, if these values for surface roughness are larger than the aforementioned ranges, namely if the surfaces are rougher, there is the possibility that the satisfactory discharge of chips as described above may no longer be obtained. On the other hand, if the values for surface roughness are smaller than the aforementioned ranges, considerable labor and time are required to give inner peripheral surface 206 a smooth finish, and since a remarkable improvement in the quality of chip discharge is not observed in comparison with this, there is the possibility of this being inefficient. Thus, the surface roughness of inner peripheral surface 206 of polished chip discharge grooves 205 is preferably within the previously defined ranges.

What is claimed is:

1. A drill bit comprising:
    a chip discharge groove twisted in the shape of a spiral formed in an outer periphery of a tip section of a roughly cylindrical drill body;
    a cutting edge formed on an intersecting ridgeline between a wall surface facing in a direction of drill rotation of the chip discharge groove and a tip flank of the drill body; wherein,
    the chip discharge groove includes,
        a narrow width section, formed along a direction of an axis of the drill bit, in which a helix angle relative to the axis of the drill bit is constant, and groove width is constant,
        a wide width section, formed along the direction of the axis of the drill bit, located farther towards a rear end of the drill bit than the narrow width section, in which the helix angle is equal to the helix angle of the narrow width section and in which the groove width is larger than the groove width of the narrow width section in the direction of drill rotation and towards the rear of the drill bit in the direction of drill rotation and the groove of the wide width section has a constant width,
        wherein an expanding width section is formed between the narrow width section and the wide width section in which the groove width of the chip discharge groove gradually becomes larger moving towards the rear end side, and the boundary between this expanding width section and the narrow width section is located within the range of 3-5×D relative to outer diameter D of the cutting edge from the outer peripheral edge of the cutting edge towards the rear end side in the axial direction.

2. A production method of a drill according to claim 1 comprising: the formation of the chip discharge groove by an abrasive particle layer by causing the outer periphery of a disk-shaped grindstone on which an abrasive particle layer is formed on the outer periphery to cut into the outer periphery of the tip section of a drill body by applying a fixed deflection angle to the grindstone so that a plane that intersects with the center line of the grindstone in a lateral view from the outer peripheral side in the radial direction relative to the axis of the drill body lies along the direction of twisting of the chip discharge groove while rotating the grindstone around the center line, and moving the drill body in the axial direction while relatively rotating around the axis relative to the grindstone according to the angle of deflection; wherein,
    the deflection angle of the grindstone is larger on the rear end side than the section on the tip side of the chip discharge groove continuous with the cutting edge.

3. A production method of a drill according to claim 1 comprising: the formation of the chip discharge groove by an abrasive particle layer by causing the outer periphery of a disk-shaped grindstone on which an abrasive particle layer is formed on the outer periphery to cut into the outer periphery of the tip section of a drill body by applying a fixed deflection angle to the grindstone so that a plane that intersects with the center line of the grindstone in a lateral view from the outer peripheral side in the radial direction relative to the axis of the drill body lies along the direction of twisting of the chip discharge groove while rotating the grindstone around the center line, and moving the drill body in the axial direction while relatively rotating around the axis relative to the grindstone according to the angle of deflection; wherein,
    the deflection angle of the grindstone is larger on the rear end side than the section on the tip side of the chip discharge groove continuous with the cutting edge.

4. A production method of a drill according to claim 3 comprising: the formation of the chip discharge groove by an abrasive particle layer by causing a disk-shaped grindstone on which an abrasive particle layer is formed on the outer periphery to cut into the outer periphery of the tip section of a drill body so that the peripheral section lies along the direction of twisting of the chip discharge groove while rotating the grindstone around its center line, and moving the drill body in the axial direction towards the direction of twisting while rotating around the axis relative to the grindstone; wherein,
    in the section serving as the expanding width section of the chip discharge groove, the drill body is respectively moved while rotating relative to the grindstone at a speed greater than and a speed less than the relative rotational movement speed of the drill body relative to the grindstone in the section serving as the narrow width section.

5. A drill bit comprising:

a chip discharge groove in the shape of a spiral formed in an outer periphery of a tip section of a roughly cylindrical drill body that rotates around an axis, and a cutting edge formed on an intersecting ridgeline between a wall surface facing in a direction of drill rotation of the chip discharge groove and a tip flank of the drill body; wherein, the chip discharge groove includes a narrow width section, formed along the axis of the drill bit, in which a helix angle relative to the axis is constant, and groove width is constant, an expanding width section, formed in the chip discharge groove farther towards a rear of the drill bit than the narrow width section, in which groove width is gradually widened in the direction of drill rotation and towards the rear of the drill bit in the direction of drill rotation as it approaches the rear of the drill bit relative to a virtual groove in which the narrow width section is extended towards the rear end of the drill bit, wherein the expanding width section includes first and second expanding stages, and a non-zero angle at which the first expanding stage expands is different than a non-zero angle at which the second expanding stage expands.

6. A drill bit according to claim 5 wherein, the boundary between the narrow width section and the expanding width section is located within the range of 3-5×D relative to outer diameter D of the cutting edge from the outer peripheral edge of the cutting edge towards the rear end side in the axial direction.

7. A production method of a drill according to claim 5 comprising: the formation of the chip discharge groove by an abrasive particle layer by causing a disk-shaped grindstone on which an abrasive particle layer is formed on the outer periphery to cut into the outer periphery of the tip section of a drill body so that the peripheral section lies along the direction of twisting of the chip discharge groove while rotating the grindstone around its center line, and moving the drill body in the axial direction towards the direction of twisting while rotating around the axis relative to the grindstone; wherein, in the section serving as the expanding width section of the chip discharge groove, the drill body is respectively moved while rotating relative to the grindstone at a speed greater than and a speed less than the relative rotational movement speed of the drill body relative to the grindstone in the section serving as the narrow width section.

8. A drill bit according to claim 5, wherein the helix angle of the groove in the narrow section is equal to a helix angle of the groove in the first expanding stage.

9. A drill bit according to claim 8, wherein the helix angle of the groove in the first expanding stage is equal to a helix angle of the groove in the second expanding stage.

10. A drill bit comprising:

a chip discharge groove extending towards a rear of the drill bit, formed in an outer periphery of a drilling end section on a tip side of a drill body that rotates around an axis of the drill bit, a cutting edge formed on an intersecting ridgeline section between an inner wall surface that faces towards a direction of drill rotation of the chip discharge groove and a tip flank of the drilling end section, and a first margin section, which is adjacent to a rear side of the chip discharge groove in the direction of drill rotation, and a second margin section, which is adjacent to a front side of the chip discharge groove in the direction of drill rotation, the first and second margin sections being formed in a land section of the drilling end section; wherein, a thinning section formed on the tip side of an inner wall surface of the chip discharge groove that is continuous with an inner peripheral edge of the cutting edge and extends to the land section, and when the drilling end section is viewed from the tip side in an axial direction, an intersecting angle between a straight line X, which connects a point in the second margin section located the farthest towards the front in the direction of drill rotation and the axis of the drill bit, and a straight line Y, which connects an outer peripheral edge located in the land section at the intersecting ridgeline between the tip flank and thinning section and the axis, is set to be within the range of −5° to 10° when straight line X is taken to be positive when located farther towards the front in the direction of drill rotation than straight line Y.

11. A drill bit according to claim 10 wherein, together with a hard coating being applied to the surface of the drilling end section, polishing is performed on at least the surfaces of the first margin section and the second margin section.

12. A drill bit according to claim 11 wherein, the drilling end section is composed of a back taper section, in which the outer diameter gradually decreases moving towards the rear end side in the axial direction, and a straight section which is continuous with the rear end of the back taper section and in which the outer diameter is roughly constant along the axial direction.

13. A drill bit according to claim 10 wherein, the drilling end section is composed of a back taper section, in which the outer diameter gradually decreases moving towards the rear end side in the axial direction, and a straight section which is continuous with the rear end of the back taper section and in which the outer diameter is roughly constant along the axial direction.

14. A drill bit according to claim 10, wherein the intersecting angle is zero.

* * * * *